United States Patent
Kirchhof et al.

(10) Patent No.: US 12,106,043 B2
(45) Date of Patent: Oct. 1, 2024

(54) GENERATING STRUCTURED DATA CONTAINERS FOR COMMUNICATION PLATFORM

(71) Applicant: Salesforce, Inc., San Francisco, CA (US)

(72) Inventors: Angela Kirchhof, Denver, CO (US); Josef Teplow, New York, NY (US); Kyle Meyer, San Francisco, CA (US); Kevin Marshall, Mill Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/151,023

(22) Filed: Jan. 6, 2023

(65) Prior Publication Data
US 2024/0232516 A1    Jul. 11, 2024

(51) Int. Cl.
| | |
|---|---|
| *G06F 3/048* | (2013.01) |
| *G06F 3/0482* | (2013.01) |
| *G06F 3/0484* | (2022.01) |
| *G06F 40/186* | (2020.01) |
| *H04L 51/216* | (2022.01) |

(52) U.S. Cl.
CPC .......... *G06F 40/186* (2020.01); *G06F 3/0482* (2013.01); *G06F 3/0484* (2013.01); *H04L 51/216* (2022.05)

(58) Field of Classification Search
CPC ..... G06F 40/186; G06F 3/0482; H04L 51/216
See application file for complete search history.

(56) References Cited

U.S. PATENT DOCUMENTS

| | | | |
|---|---|---|---|
| 7,328,242 B1 * | 2/2008 | McCarthy | G06Q 10/10 709/204 |
| 7,606,865 B2 * | 10/2009 | Kumar | H04L 67/131 709/217 |
| 8,819,536 B1 * | 8/2014 | Lucovsky | G06Q 10/10 715/205 |
| 9,842,145 B2 * | 12/2017 | Cort | G06F 16/27 |
| 10,430,388 B1 | 10/2019 | Saviano et al. | |
| 11,140,203 B1 * | 10/2021 | Butterfield | H04L 12/1822 |
| 11,240,278 B1 | 2/2022 | Wang | |
| 2011/0119593 A1 * | 5/2011 | Jacobson | H04L 51/18 715/736 |

(Continued)

OTHER PUBLICATIONS

Mishra et al., Thread-based vs Event-based Implementation of a Group Communication Service, 1998, IEEE, 5 pages.*

(Continued)

*Primary Examiner* — Linh K Pham
(74) *Attorney, Agent, or Firm* — Lee & Hayes, P.C.

(57) ABSTRACT

Techniques for generating structured data containers via a communication platform and messaging threads associated with the structured data containers are discussed herein. For example, the communication platform may, in response to receiving a request from a user of the communication platform, generate a structured data container representing a system of record associated with the communication platform, the structured data container containing a plurality of fields and information associated with an interaction via the communication platform. The communication platform may further generate and present, via a messaging thread, the structured data container including the plurality of fields.

18 Claims, 19 Drawing Sheets

(56) References Cited

U.S. PATENT DOCUMENTS

| | | | |
|---|---|---|---|
| 2014/0012927 A1* | 1/2014 | Gertzfield | G06F 16/287 |
| | | | 709/206 |
| 2014/0115502 A1* | 4/2014 | Van Wie | G06F 3/011 |
| | | | 715/757 |
| 2014/0280602 A1 | 9/2014 | Quatrano | |
| 2017/0364866 A1 | 12/2017 | Steplyk et al. | |
| 2018/0136829 A1 | 5/2018 | Soni | |
| 2018/0189706 A1 | 7/2018 | Newhouse | |
| 2018/0287982 A1 | 10/2018 | Draeger et al. | |
| 2018/0307383 A1 | 10/2018 | Faulkner | |
| 2019/0014065 A1* | 1/2019 | Lim | H04L 51/216 |
| 2019/0058680 A1* | 2/2019 | Rosania | H04L 51/216 |
| 2021/0041997 A1* | 2/2021 | Voss | G06F 3/0482 |
| 2021/0185105 A1* | 6/2021 | Van Wie | H04L 65/00 |
| 2021/0255744 A1 | 8/2021 | Sullivan | |
| 2021/0342785 A1 | 11/2021 | Mann | |
| 2021/0349604 A1 | 11/2021 | Van Wie et al. | |
| 2022/0027021 A1 | 1/2022 | Bliss | |
| 2022/0261760 A1 | 8/2022 | Cupala | |
| 2022/0294756 A1 | 9/2022 | Khosrowshahi | |
| 2022/0368658 A1 | 11/2022 | Soman | |
| 2022/0417298 A1 | 12/2022 | Vaid | |
| 2023/0049885 A1* | 2/2023 | Bakshi | H04L 51/224 |
| 2023/0252415 A1 | 8/2023 | Ackerman-Greenberg | |

OTHER PUBLICATIONS

Emeakaroha et al., Analysis of Data Interchange Formats for Interoperable and Efficient Data Communication in Clouds, 2013, IEEE, 6 pages. (Year: 2013).*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut us all Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 18/151,057, dated Sep. 14, 2023, Inventor #1 Angela Kirchhof, "Integrating Structured Data Containers into Virtual Spaces for Communication Platform," 20 pages.

PCT Search Report and Written Opinion mailed Apr. 12, 2024 for PCT Application No. PCT/US2023/084337 from PCT Summary, 26 pages.

Office Action for U.S. Appl. No. 18/515,057, mailed on May 2, 2024, Kirchof, "Integrating Structured Data Containers into Virtual Spaces for Communication Platform", 24 Pages.

Office Action for U.S. Appl. No. 18/515,131, mailed on Apr. 5, 2024, Kirchof, "Integrating Structured Data Containers Via Templates for Communication Platform", 15 Pages.

* cited by examiner

FIG. 2B

Acme

- Threads
- All DMs
- @ Mentions & reactions
- Saved items
- Connect
- Lists
- ▶ Connections
- ▼ Channels
  - #general
  - #legal-review
  - ● project_zen
- ▶ Documents
  - zen_todos
- ▼ Direct messages
  - J. Smith
  - C. Simon
  - J. Smith, B. Good...
- ▶ Apps ● project_zen Q Search Acme

Content Legal Review ▼  602

Unassigned   Assigned to me   + Add view

| Issue | Status ▼ | Due Date ▼ | Owner ▼ | Thread ▼ | Audience ▼ | Sort  Copy Link  Content ▼ |
|---|---|---|---|---|---|---|
| 1  Power of Positive: Blog Post | review | ASAP | C. Simon | 2 replies | Social Media | http://docs.goo |
| 2  New Hire Welcome Video | review | 1/31/2023 | J. Smith | | Press, External | ▲ New Hire |
| 3  Project Acme Press Release | review | 2/2/2023 | + Add | 9 replies | Internal Marketing | Press Rel |

+ New

1 Filter

FIG. 6

Acme

- Threads
- All DMs
- @ Mentions & reactions
- Saved items
- Connect

Lists
- Connections
- Channels
  - # new-hire
  - # legal-review
  - # project_zen

- Documents
  - zen_todos
- Direct messages
  - J. Smith
  - C. Simon
  - J. Smith, B. Good...
- Apps @ project_zen Q Search Acme

Content Legal Review ▼

Unassigned    Assigned to me    + Add view

| # | Issue | Status ▼ | Due Date ▼ | Owner ▼ |
|---|-------|----------|------------|---------|
| 1 | Power of Positive: Blog Post | review | ASAP | C. Simon |
| 2 | New Hire Welcome Video | review | 1/31/2023 | J. Smith |
| 3 | Project Acme Press Release | review | 2/2/2023 | + Add |

(+) New

Item Content Legal Review  *702*

New Hire Welcome Video

| | |
|---|---|
| Owner | J. Smith |
| Status | review |
| Due Date | 1/31/2023 |
| Link to Content | ▲ New Hire Vid. |
| Audience | Press, External |
| Mentions | 1 mention |

Potential Issues to Flag?
We are changing the graphic on intro slide, but the content will stay the same.
1 reply ⭐ A. User 4 hours ago
Hey @Cindy, I wanted to confirm that we are cleared to use the proposed image on slide 4. Thanks!  *704*

(+) Add Reply...

GENERATING STRUCTURED DATA CONTAINERS FOR COMMUNICATION PLATFORM

TECHNICAL FIELD

Communication platforms are becoming increasingly more popular for organizations to facilitate communication and collaboration among and between users. Users of such communication platforms can communicate with one another via channels, direct messages, and/or other virtual spaces by sending data. Due to the vast nature of data saved and stored on the communication platform, even with existing search functions, it is often difficult to easily find and track such data. As a result, data may be forgotten or lost, especially in a communications platform with asynchronous conversations. Further, existing methods for tracking and recording data, such as electronic spreadsheets, are cumbersome to use and not designed for collaborative use.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

FIG. 6 illustrates an example interface comprising an example list containing multiple structured data containers.

FIG. 7A illustrates an example interface comprising a messaging thread associated with a structured data container.

FIG. 7C illustrates an example interface usable for updating a structured data container based on data received from a virtual space associated with the structured data container.

FIG. 7D illustrates an example interface for modifying a field of a structured data container via a messaging thread.

FIG. 7E illustrates an example interface comprising an instance of a structured data container including a modification to a field of the structured data container.

DETAILED DESCRIPTION

Figure 1:
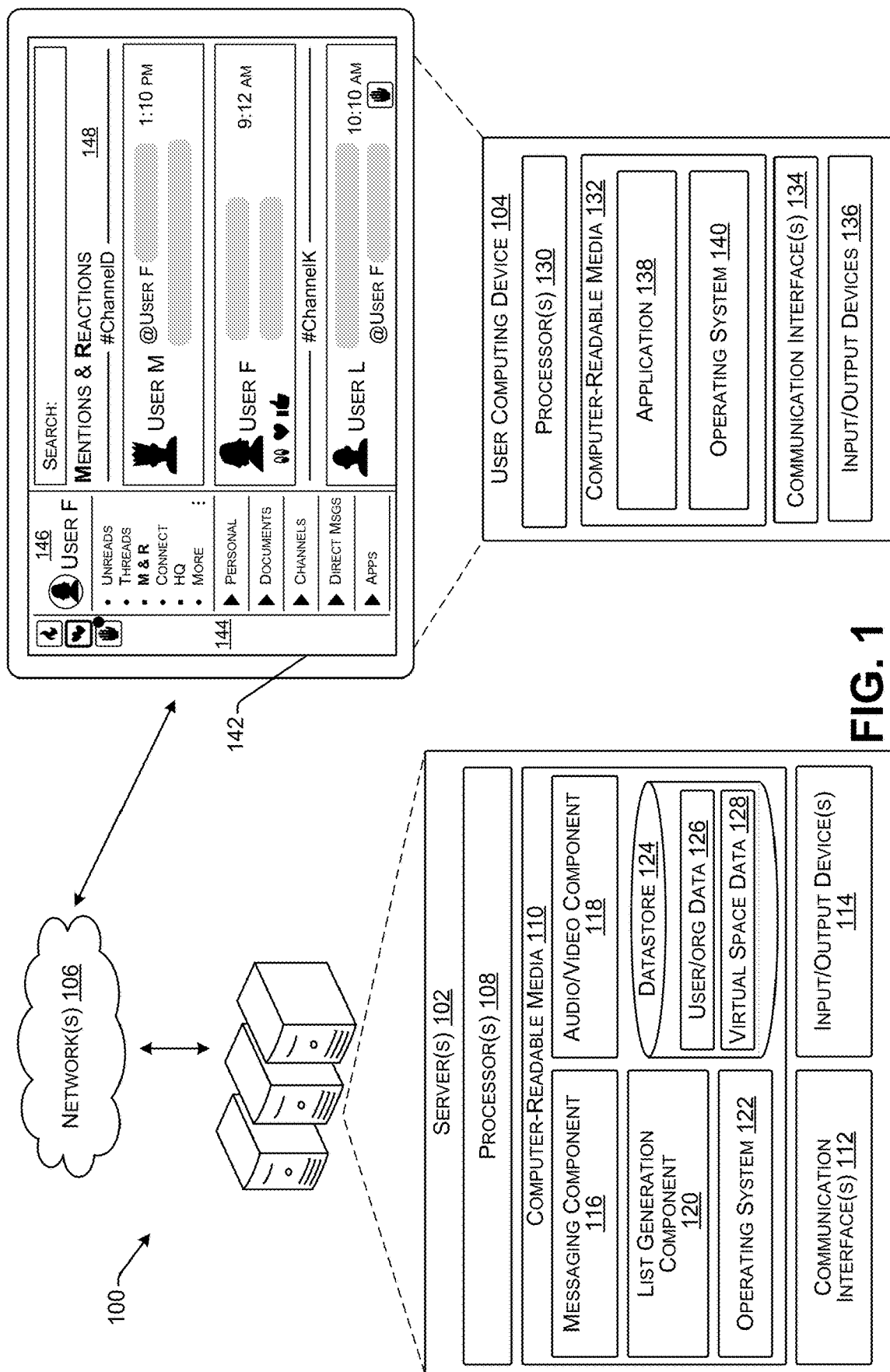
FIG. 1 illustrates an example system for performing techniques described herein.

The ability to effectively and efficiently collaborate via systems of record on a communications platform presents many challenges. For example, many users communicate via communication platforms by sending data such as messages, documents, and other media files. These communications are particularly useful for groups of individuals collaborating on projects, such as organizations and corporations consisting of high numbers of workflows. In the instance of larger-scale projects and workflows, copious amounts of data is often exchanged between many individuals of various positions and departments. To keep track of such projects and workflows, organizations often rely on electronic applications or software, such as electronic spreadsheets, to manage and store data and information. However, such techniques are limited in quantity and scope.

The large-scale nature of many projects often requires managing a large amount of data and keeping track of many moving parts. However, due to the collaborative nature of such projects, people often rely on others, such as teammates and co-workers, to complete tasks such as reviewing data, generating content, and so forth. Oftentimes, such tasks are lost within the sheer amount of data being transmitted within an organization, especially in a communication platform that includes numerous synchronous and asynchronous communications. For example, messages may be scattered across multiple platforms and teams making it difficult to keep track of current status and tasks. This often results in individuals missing messages or failing to see notifications. As such, collaboration is often inhibited, resulting in lost time and revenue.

Thus, this disclosure describes techniques for generating systems of record which incorporate data across communication platforms to provide a "back-office" of an organization's tasks and projects. For example, and as described herein, a group-based communication platform may generate a "List" comprising one or more structured data containers representing a system of record. The one or more structured data containers may contain one or more fields, which may be associated with data related to the group-based communication platform. In other words, the group-based communication platform may allow users to generate lists comprising one or more "tasks," wherein each task, or structured data container, may be associated with aspects of the communication platform, such as launch dates, files and documents, and contributors to the task, for example.

In some examples, the group-based communication platform may generate a messaging thread associated with one or more of the structured data containers, wherein the messaging thread serves not only as a singular, designated space for users to communicate and share data associated with the structured data container but keeps a record of modifications made to the structured data container. Thus, users are provided with an easily accessible and centralized view of all relevant details relating to a task or project, for example. Additionally, the structured data containers may be shared to other virtual spaces of a communication platform, such as a direct message, or a channel, allowing users to seamlessly integrate other users into the structured data container. Moreover, any changes made to any instance of a structured data container may be automatically updated across the communication platform to other instances of the structured data container, such that information is always accurate and up to date.

As illustrated by these examples, the techniques described herein can improve the functioning, efficiency, and overall user experience of the communication platform by generating structured data containers and corresponding messaging threads to organize and manage data. The techniques described herein may improve user experiences via an improved graphical user interface (GUI) for a communication platforms by allowing users the ability to effectively customize and curate lists of tasks and projects by enabling users to generate lists containing one or more structured data containers comprising fields associated with interactions via the group-based communication platform. These techniques not only enable users to systematically track information, but keeps users informed of modifications made to such information. Further, the techniques discussed herein may solve technical problems associated with the presence of voluminous amounts of data associated with maintaining communication data across a communication platform. The techniques may therefore reduce the amount of hardware and/or software required to accomplish data transmissions, thereby increasing the available memory and/or computational cycles available and reducing power consumption. As such, systems structured in accordance with various examples of the disclosure provide specific, technical solutions to technical problems, the details of which are described herein.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things $1$2 device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a list generation component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the list generation component 120 can manage the generation, modification, updating, and/or sharing of structured data containers. As described above, the term "list" broadly encompasses one or more structured data containers generated via the group-based communication platform. The structured data container may represent a system of record with the group-based communication platform. In other words, a list may include one or more structured data containers, and provide a method of storing, categorizing, managing, and altering data associated within the group-based communication platforms. In some examples, the structured data container may comprise one or more fields. A field may be, for example, an element of the structured data container that may be configured to receive data. The data may correspond to a data category associated with the group-based communication platform, such as, for example, a task title, a description, a status, an issue type, a date submitted, a due date, a release date, a launch date, an owner, a creator, a thread, an audience, a content item, or a rating, to name a few non-limiting examples. Additionally, or alternatively, the structured data container may contain information associated with an interaction associated with the group-based communication platform. In other words, the one or more fields may include data associated with an interaction via the group-based communication platform.

In some examples, the list generation component 120 may facilitate the generation of one or more structured data container. For example, the group-based communication platform may receive from a user associated with the communication platform, a request to create a structured data container. The request may be received via any area of the group-based communication network, such as via a channel, a multimedia collaboration session such as a huddle, a canvas, a template, a direct message, a list-generation interface, a workflow, or a thread, to name a few non-limiting examples. Based at least in part on receiving the request to generate the structured data container, the list generation component 120 may prompt the user to select one or more fields associated with the structured data container, such that the user may determine data to associate with the structured data container.

In some examples, a structured data container may be generated via a template and/or a workflow. For example, based at least in part on receiving a request to create a structured data container, the list generation component 120 may present, to the user, one or more templates from which the user may select as a structured data container. In some examples, the one or more templates may correspond to common workplace processes. For example, a template may be associated with submitting a request for assistance to an information technology (IT) department. The template may include fields associated with at least one of an issue, an area of technology, a screenshot of the issue, and/or a date of the issue. Thus, users of the group-based communication platform in need of IT assistance may include, in the respective fields, information associated with one or more interactions via the group-based communication platform such that once submitted, the IT department may receive the information necessary to diagnose and remedy any issues.

In some examples, the list generation component 120 may generate a messaging thread associated with at least one field of the plurality of fields of the structured data container. A messaging thread may include a different space of the group-based communication platform presented via a same feed a different space of the group-based communication platform. Messaging threads are described in more detail below, in FIGS. 2A and 2B. In some examples, the messaging thread associated with at least one field of the plurality of fields may include information associated with at least one field of the plurality of fields and/or information associated the interaction associated with the group-based communication platform. The messaging thread associated with the list may, in some examples, update data associated with the messaging thread such that changes made to the structured data container are reflected in the messaging thread. For example, continuing with the example above, suppose that a user of the group-based communication platform entered, via the request for IT assistance workflow, a date of Jan. 31, 2023. The list generation component 120 may update a "date" field of a corresponding structured data container to reflect the date of Jan. 31, 2023, wherein the date includes first information associated with a first interaction associated with the group-based communication platform. The user may then decide to update the date from Jan. 31, 2023, to Jan. 24, 2023, wherein the updated date includes second information associated with a second interaction associated with the group-based communication platform. Based at least in part on receiving the updated information, the list generation component 120 may cause presentation, via the messaging thread, of first metadata associated with the first information and second metadata associated with the second information, such that the second metadata includes an indication of the change to the first information. In other words, the list generation component 120 may cause presentation, via the messaging thread, of the change of date. In this way, users of the structured data container may easily be made aware of any changes made to the structured data container.

While the current example describes updating a messaging thread associated with a structured data container based on changes to the structured data container, the list generation component 120 may alter the structured data container based at least in part on changes made to data associated with the plurality of fields associated with the structured data container via other instances of the structured data container. In addition or alternative to a messaging thread, instances of the structured data container may be accessible via and/or shared to other virtual spaces of the group-based communication platform, such as a channel, a canvas, a direct message, or a huddle, to name a few non-limiting examples. Similar with that described above with respect to the messaging thread, changes to one or more fields of the plurality of fields may be reflected in other instances of the structured data container. Generating, modifying, updating, and sharing structured data containers is described in further detail below, in FIGS. 4A-9. Additional details of operations that can be performed by the list generation component, such as generating, modifying, updating, and/or sharing structured data containers are described below.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j_doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
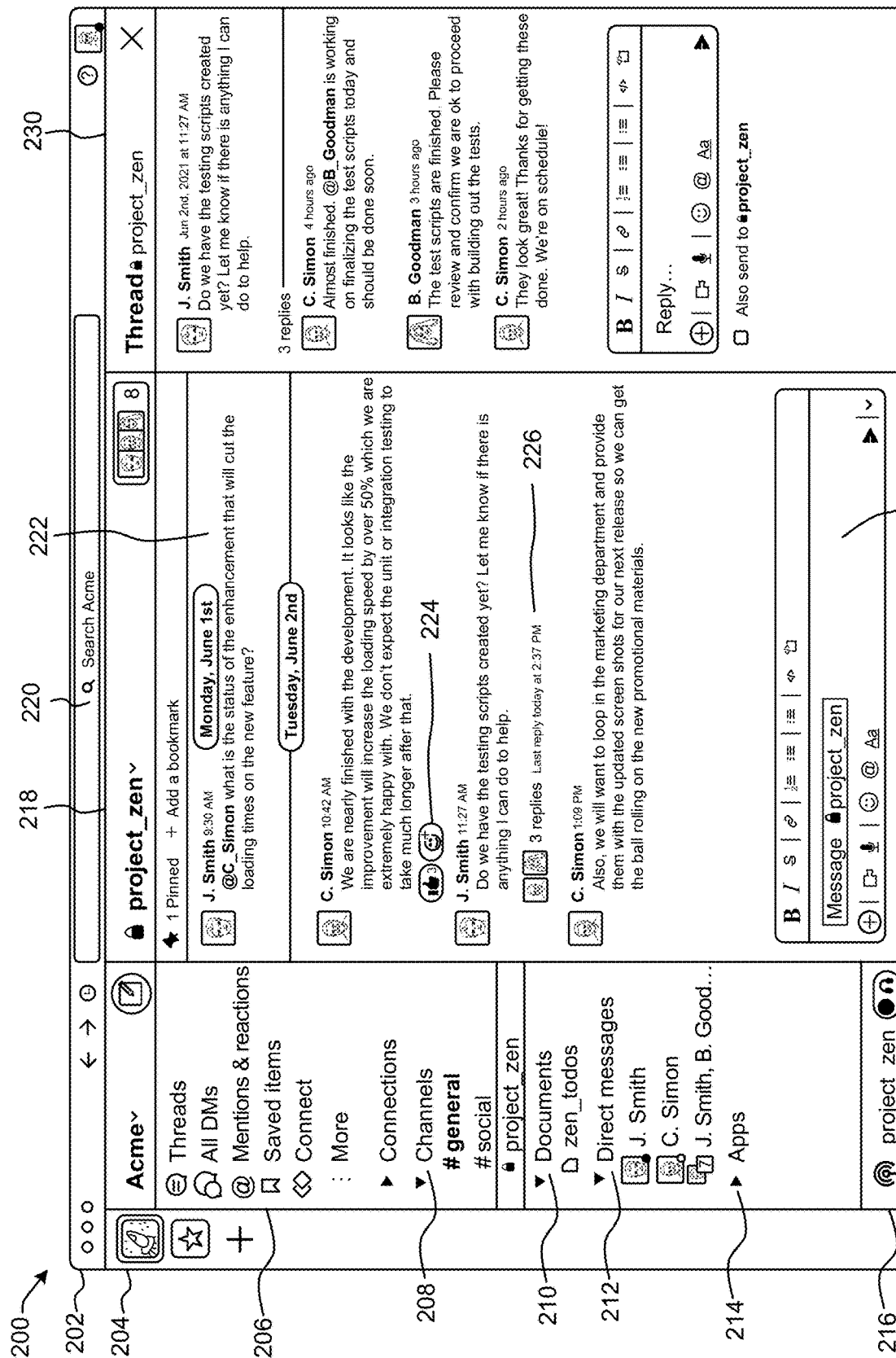
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads"

can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
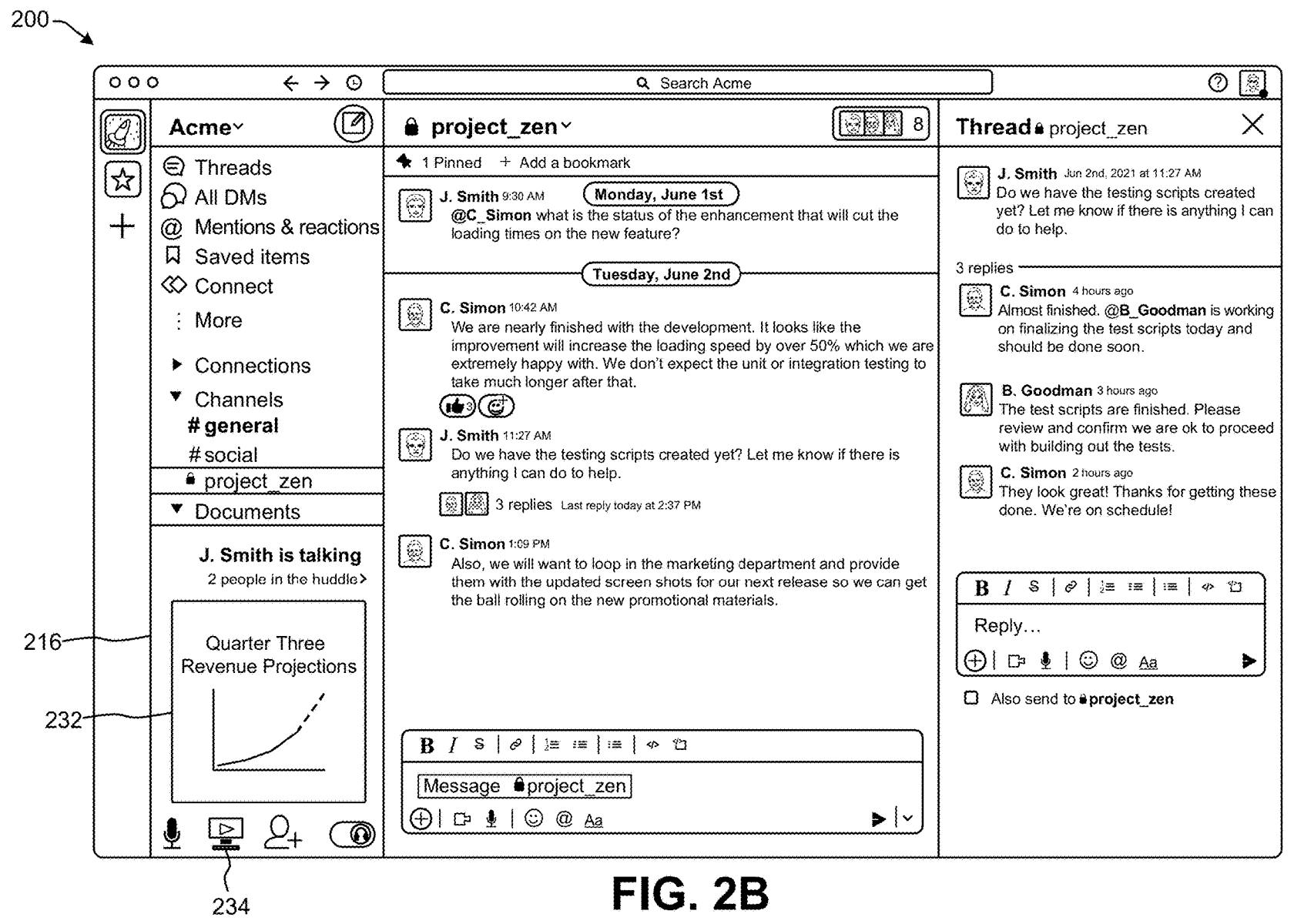

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting within the Group-Based Communication System

Figure 2C:
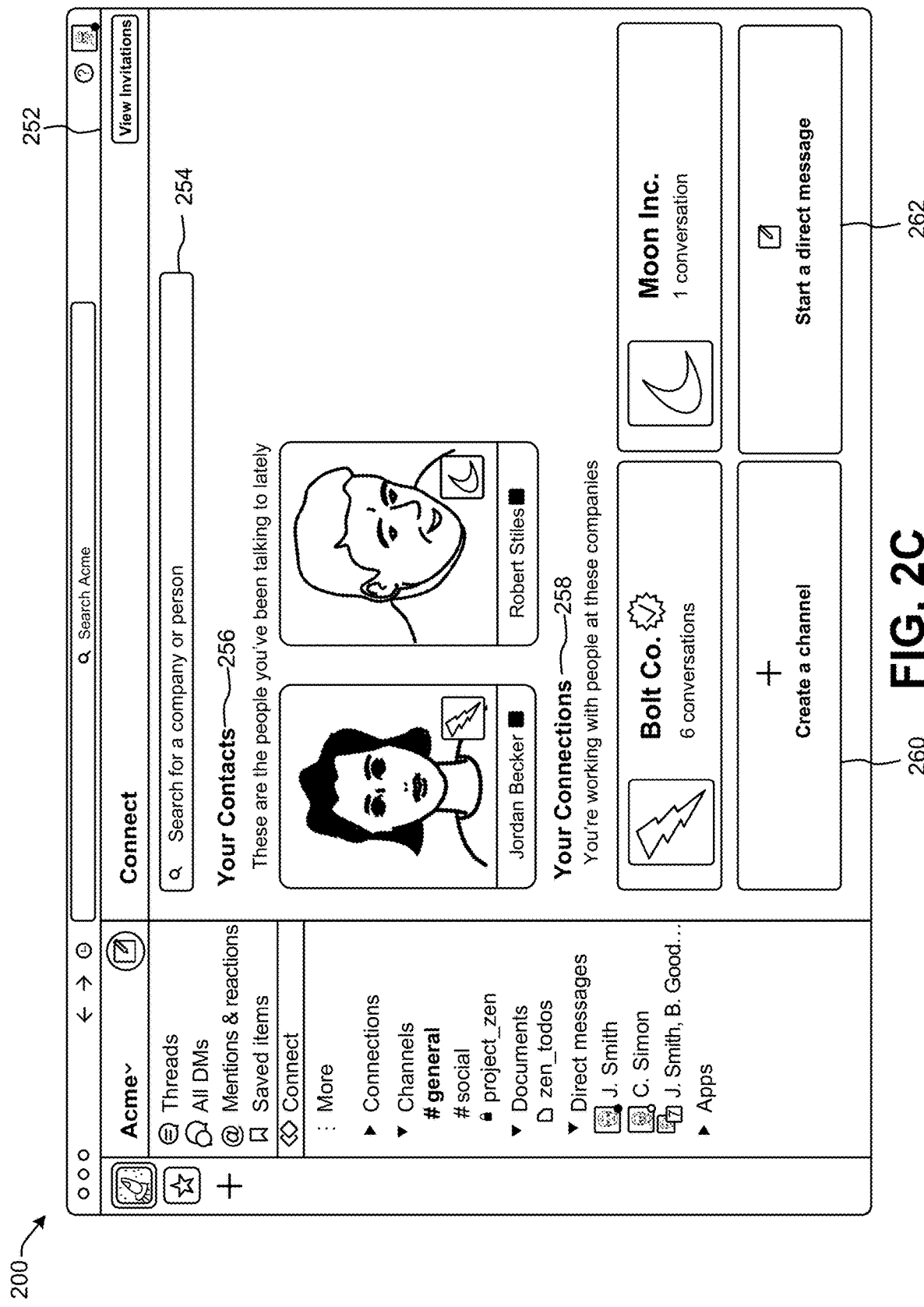
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username. Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
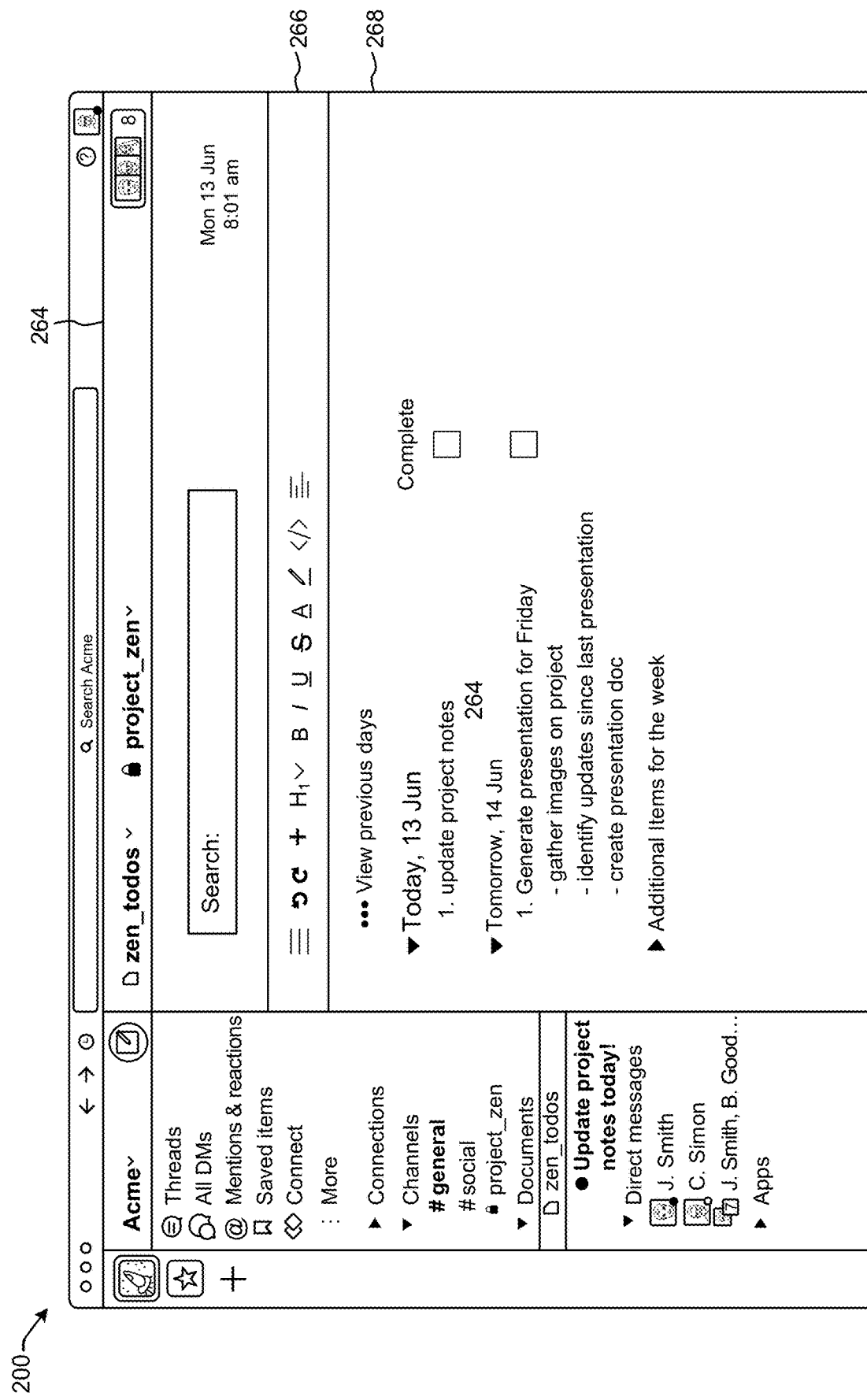
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
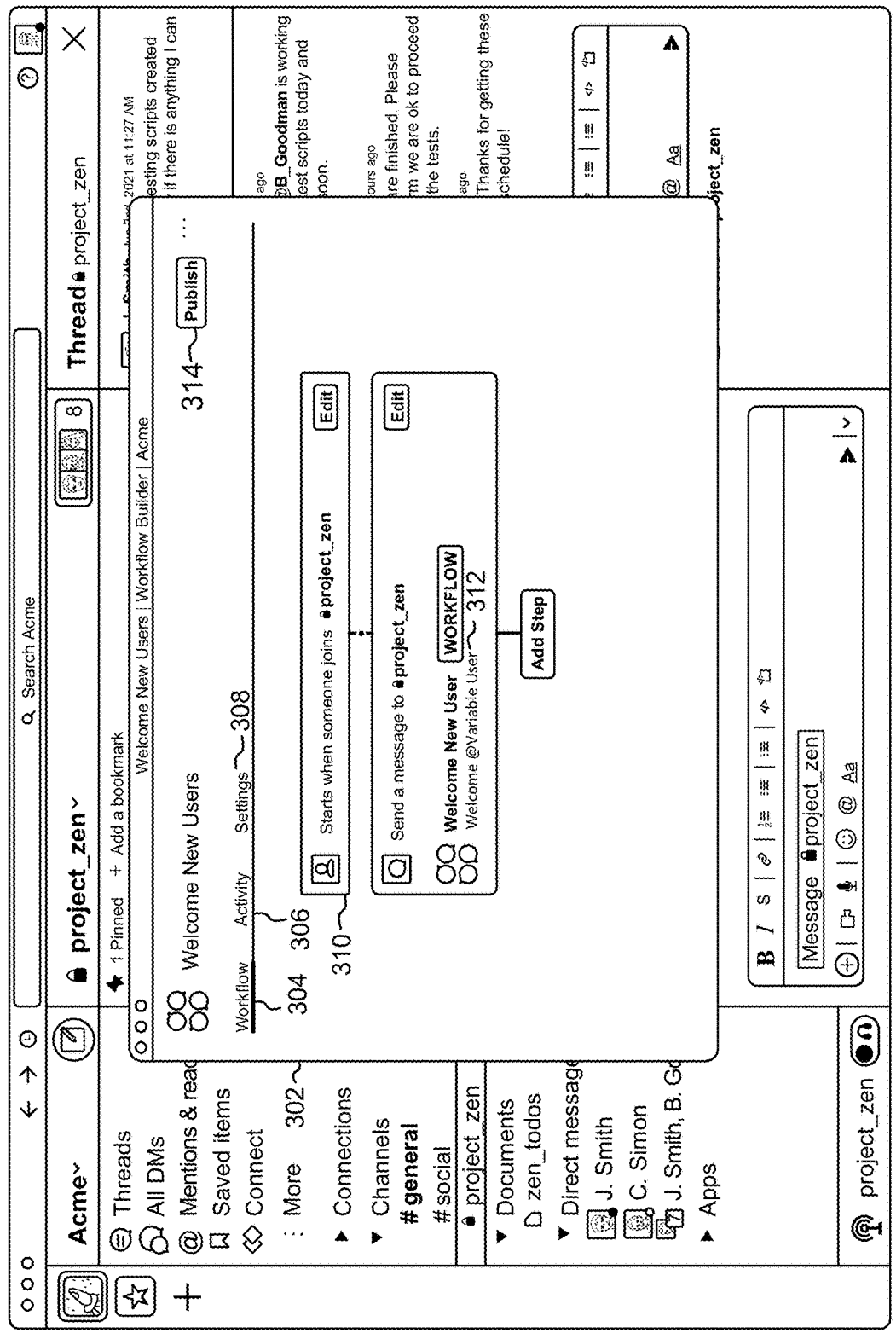
FIG. 3A depicts a user interface for workflows within a group-based communication system.

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
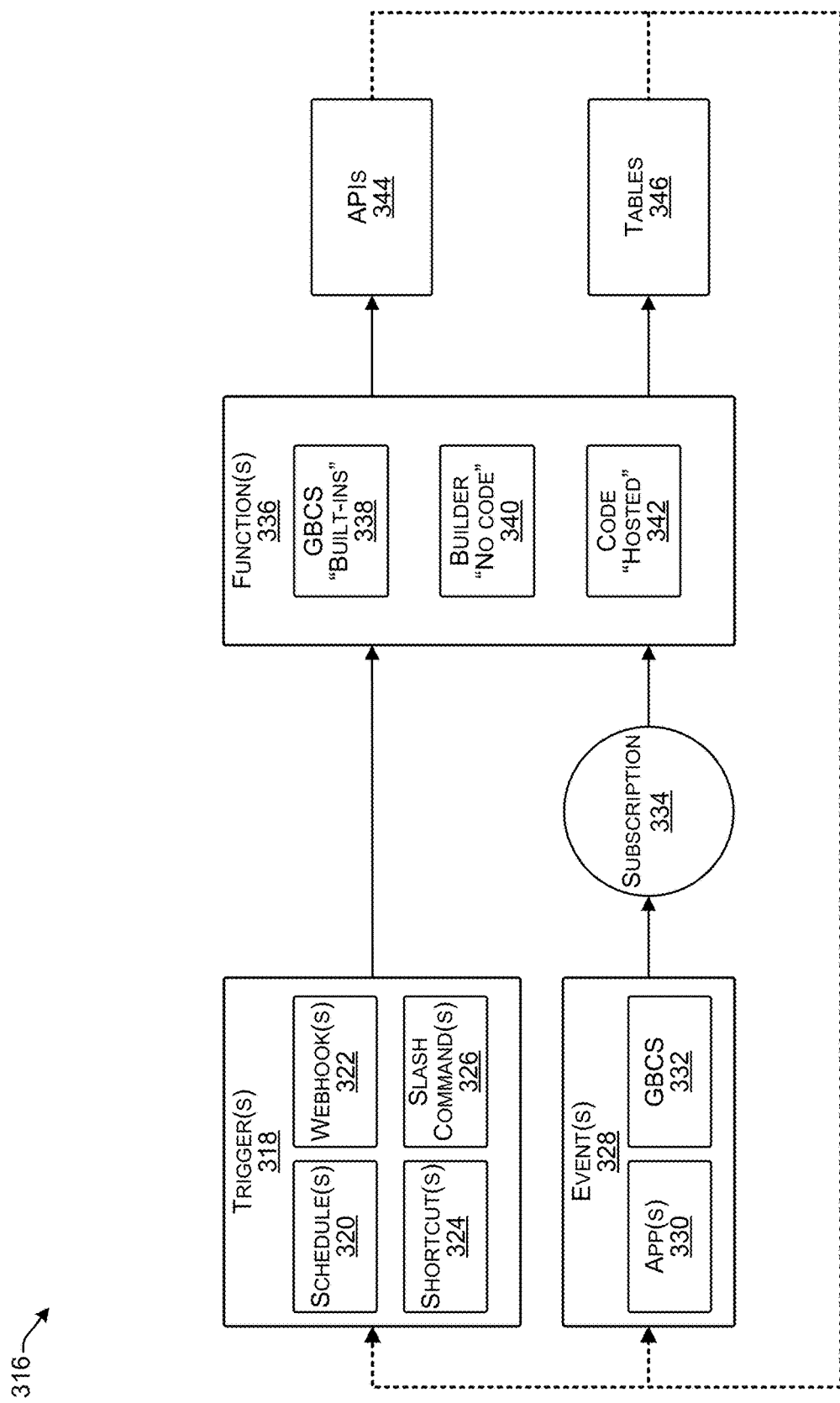
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4A:
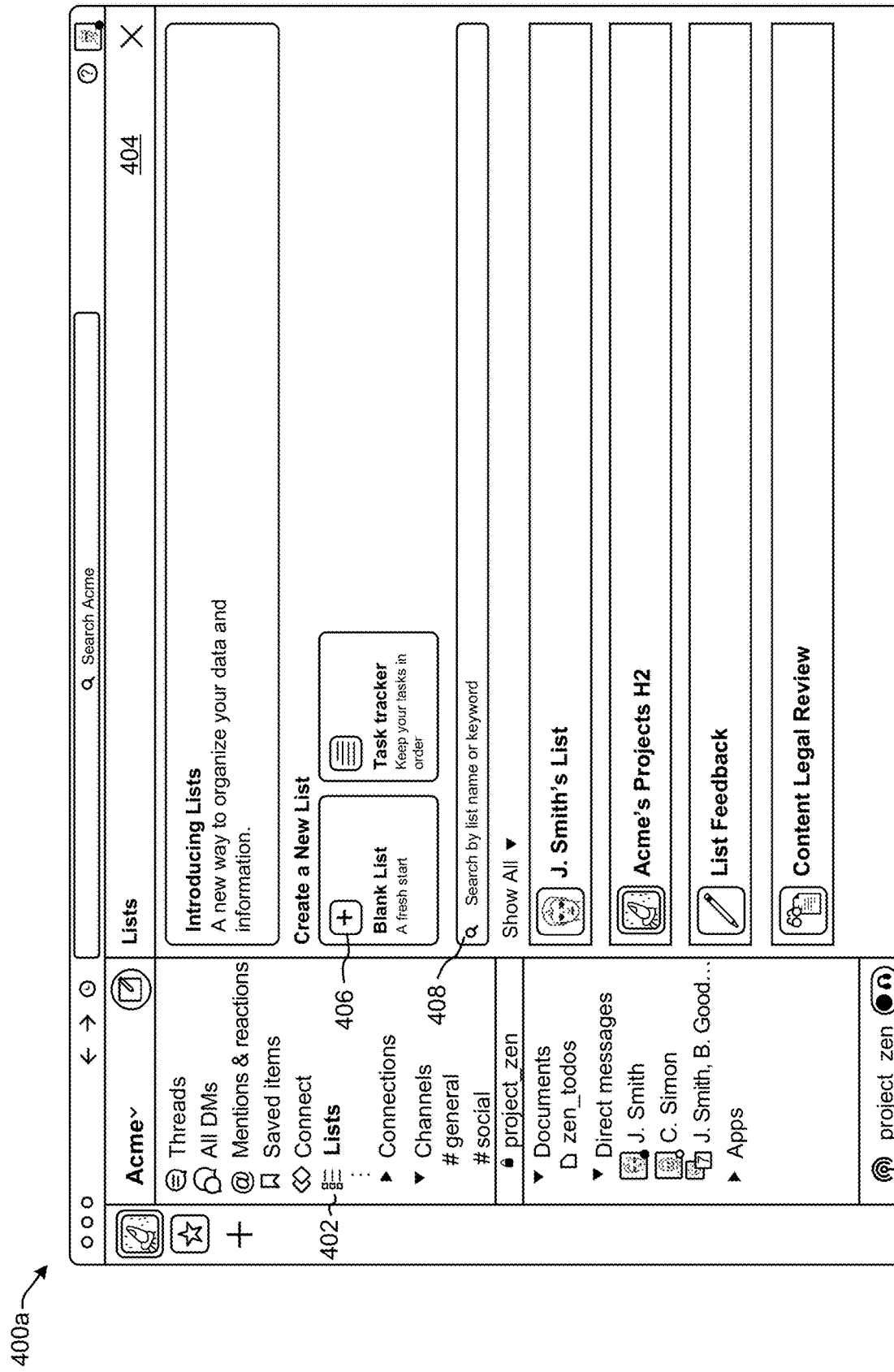
FIG. 4A illustrates an example interface for generating a structured data container via a list generation interface.
Figure 4B:
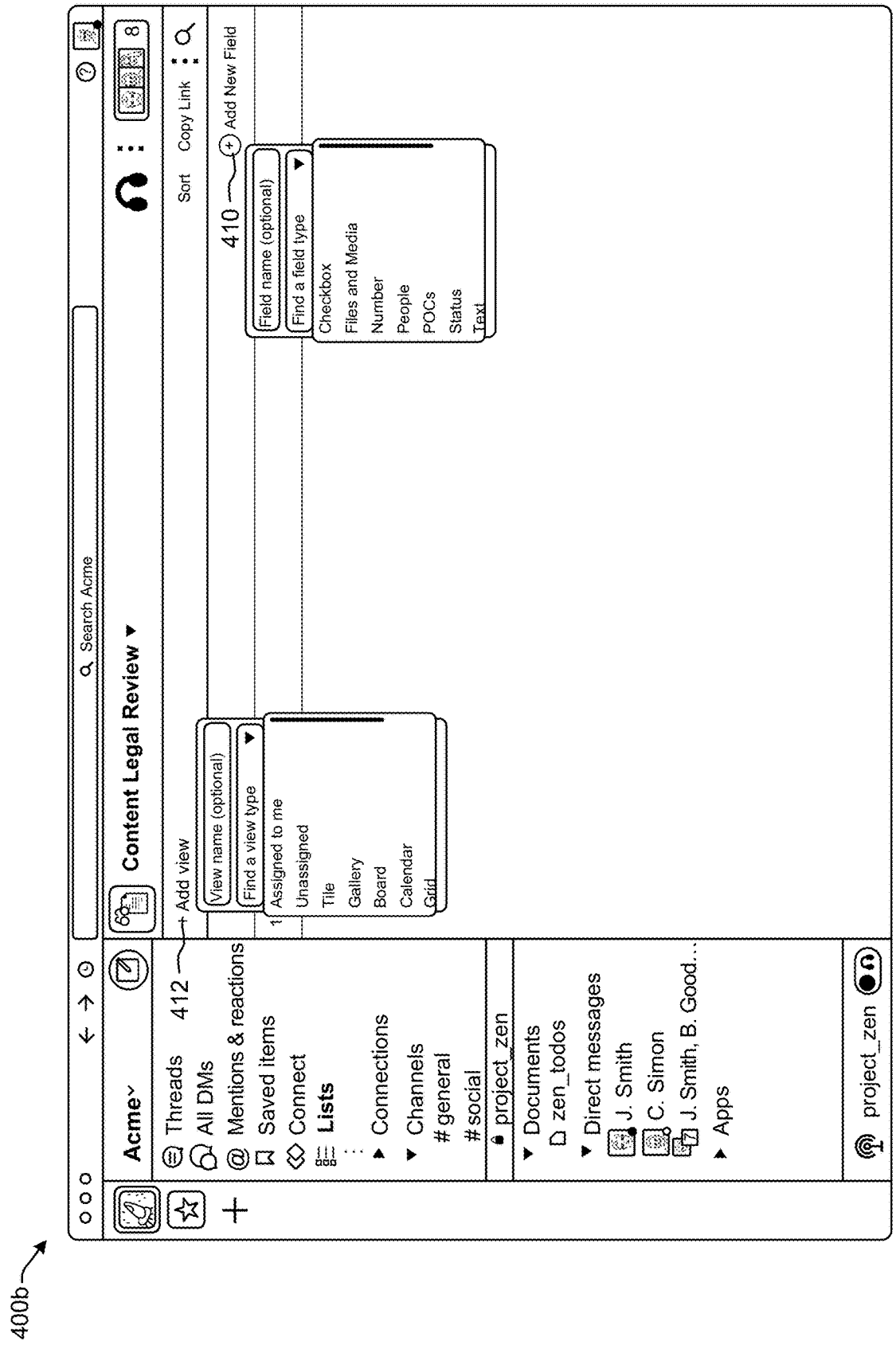
FIG. 4B illustrates an example interface usable for generating a blank structured data container.

FIGS. 4A and 4B illustrate example interfaces 400a and 400b, respectively, usable for generating one or more structured data containers via a list generation interface. FIG. 4A illustrates an example interface 400a for generating a structured data container via a list generation interface. For example, based at least in part on receiving a selection of a "Lists" indicator 402, the group-based communication platform may cause presentation of a lists interface 404. In some examples, the list interface 404 may include one or more options associated with generating a list, herein referred to as a "structured data container." For example, a user of a group-based communication platform may request to create a structured data container via the group-based communication platform. In some examples, the user may generate a blank list, such as by a selection of control 406. Generation of a blank list is described in further detail in FIG. 4B, below.

In other examples, the user may, via the list generation interface 404, access one or more existing lists. For example, the list generation interface 404 may include a search mechanism 408 which may be configured to receive, from the user, an input corresponding to an existing structured data container. In some examples, the list generation interface 404 may include one or more selectable controls associated with existing lists, such as the list "J. Smith's List" and "Acme's Projects H2."

FIG. 4B illustrates an example interface 400b usable for generating a blank structured data container. For example, the group-based communication platform may present user interface 400b to the user based at least in part on receiving, from the user, an indication to generate a blank structured data container, such as by a selection of control 406 in FIG. 4A. In some examples, the interface 400b may include one or more options associated with generating a structured data container. For example, the interface 400b may include one or more options associated with adding one or more fields, such as by a selection of control 410. A field may be, for example, an element of the structured data container that may be configured to receive data. For example, a field may be similar to that of a column in a table, in which the individual ones of the fields represent an interaction with the group-based communication platform. For example, a user may determine a field type to be a checkbox, a file, media, a number, a person, a point of contact (POC), a status, or text, to name a few non-limiting examples.

In some examples, the interface 400b may additionally or alternatively include one or more options associated with viewing the structured data container, such as by a selection of control 412. Options associated with viewing the structured data container may include filtering one or more fields associated with one or more structured data containers. For example, the structured data container(s) may be filtered such that fields associated with a particular user of the group-based communication platform are presented, or may be presented above fields and/or structured data containers assigned to other users, and/or fields and/or structured data containers that are unassigned.

Additionally, or alternatively, options associated with viewing the structured data container may include a visual presentation of the one or more fields associated with the structured data container. Although not illustrated in FIG. 4B, this may include, for example, viewing the structured data container in a tile view (wherein the one or more structured data containers are illustrated as individual "tiles"); a gallery view (wherein the one or more fields of the one or more structured data containers are illustrated as individual "cards"); and/or a calendar view (wherein the one or more fields and/or the one or more structured data containers are presented via a calendar corresponding to a data associated with the one or more fields and/or one or more structured data containers), to name a few non-limiting examples.

Figure 5A:
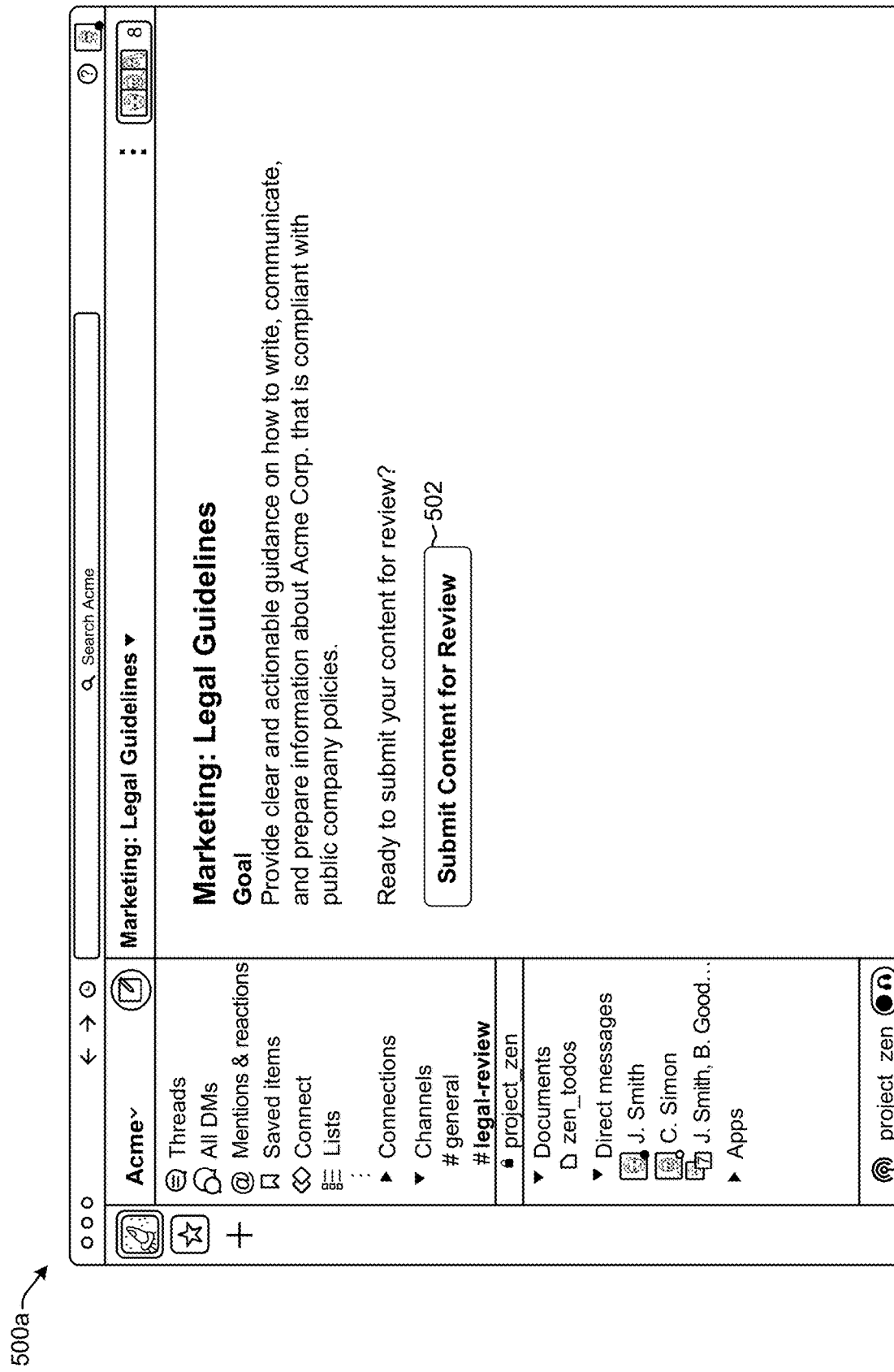
FIG. 5A illustrates an example interface usable for generating a structured data container via a template in a channel.
Figure 5B:
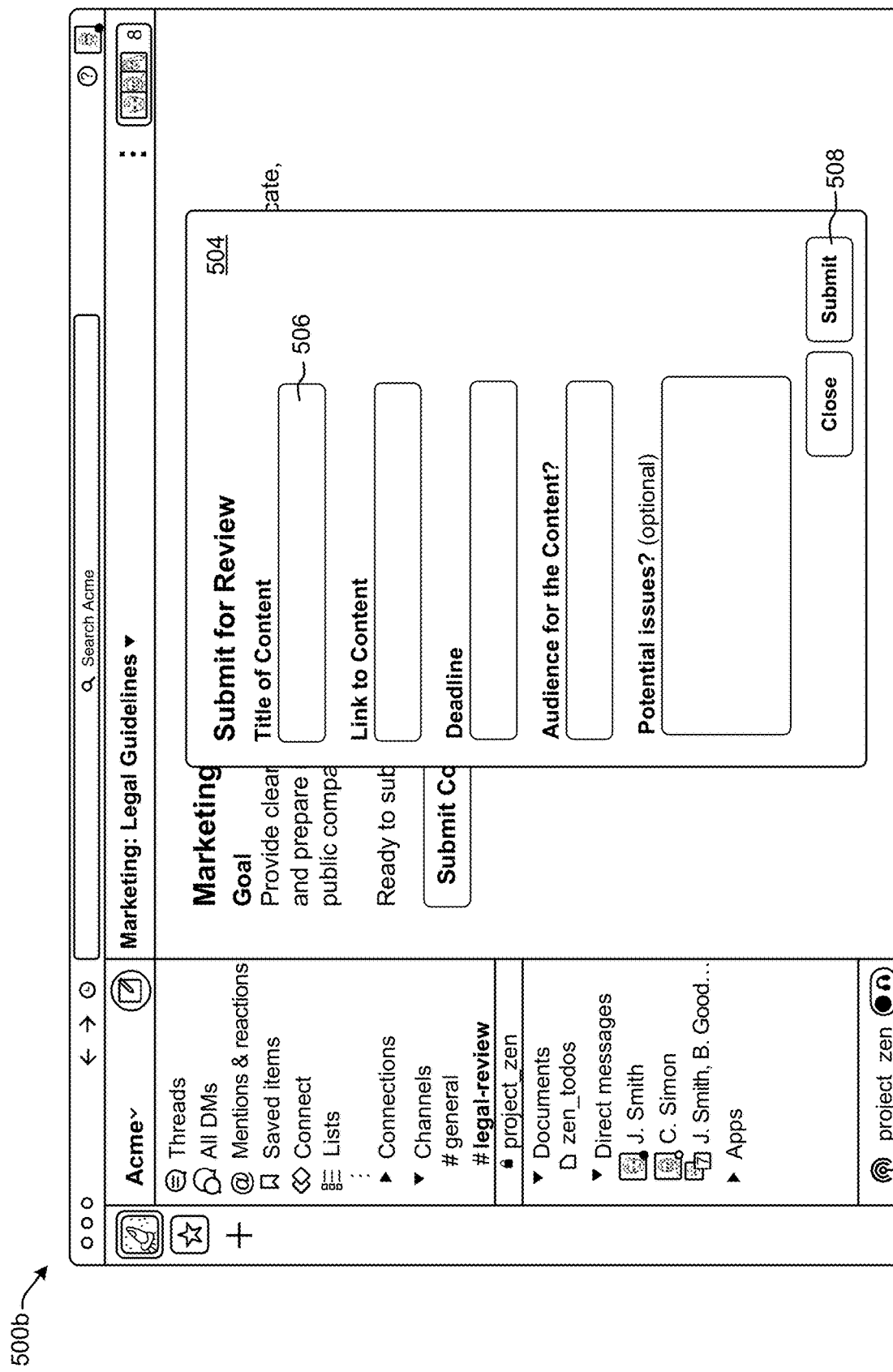
FIG. 5B illustrates an example interface usable to generate a structured data container via a template.

FIGS. 5A and 5B illustrate example interfaces 500a and 500b, respectively, usable to generate a structured data container via a virtual space. Although the virtual space illustrated in FIGS. 5A and 5B is a channel, a structured data container may be generated via any virtual space, including, but not limited to, a direct message, a thread, a huddle, and/or a canvas. FIG. 5A illustrates an example interface 500a usable for generating a structured data container via a template in a channel. For example, a user may, via a template, generate one or more structured data containers by entering data into the template. As an illustrative example, suppose the user is a project lead on a marketing project and is ready to submit the project for approval from a legal department associated with the user's company. As illustrated in FIG. 5A, the user has accessed the channel titled "Marketing: Legal Guidelines." Based at least in part on accessing the "Marketing: Legal Guidelines" channel, the group-based communication platform may cause presentation, to the user, of one or more options to submit content for review, such as by a selection of the control 502.

FIG. 5B illustrates an example interface 500b usable to generate a structured data container via a template. For example, based at least in part on receiving a selection of the control 502 by the user, the group-based communication platform may cause presentation, to the user, of template 504. The template 504 may be generated by the group-based communication platform and/or by a user of the group-based communication platform, such as by a member of the legal department. In some examples, the template 504 may include one or more fields, such as field 506. The inputs may, in some examples, correspond with one or more fields of a structured data container. In some examples, the structured data container corresponding to the template 504 may be an existing structured data container, such that based at least in part on receiving the inputs to the template, such as at field 506, the group-based communication platform may update the information to one or more corresponding, pre-existing fields. Additionally, or alternatively, a structured data container corresponding to the template 504 may be generated based at least in part on receiving the input to one or more fields associated with the template 504. For example, based at least in part on receiving input to one or more fields 506 of the template 504 (such as by receiving, from the group-based communication platform, an indication of a selection of the "Submit" control 508 by the user), the group-based communication platform may generate a structured data container containing one or more fields, wherein the one or more fields of the structured data container correspond to the fields of the template 504 and the data associated with the one or more structured data containers are associated with the user input to the one or more fields of the template 504.

In other examples, a structured data container may be generated based at least in part on a generation of a template but prior to receiving input to the template. Generating a structured data container via a virtual space is described in more detail in FIG. 9, below.

FIG. 6 illustrates an interface 600 comprising an example list 602 containing multiple structured data containers. For example, the example list illustrated in interface 600 may correspond to the template illustrated in FIGS. 5A and 5B associated with "Marketing: Legal Guidelines." As illustrated in interface 600, the list titled "Content Legal Review" contains three structured data containers, wherein each structured data container includes an issue to be reviewed.

Continuing with the illustrative example above, the project lead discussed in FIGS. 5A and 5B may submit, via the template 504, a New Hire Welcome Video to be reviewed by the legal department associated with the project lead's company (Issue 2). Based at least in part on receiving the template and input to the corresponding template fields, the group-based communication platform may generate a structured data container. In some examples, the input to the template may be populated such that the input to a field of a template corresponds to an input on a field of the structured data container. In the current illustration, the project lead, J. Smith, entered to the template 504, an issue "New Hire Welcome Video," a due date of Jan. 31, 2023, an audience "Press, External," and a video content item titled "New Hire."

In some examples, one or more fields of a structured data container may be editable, such that an edit made to a field of one instance of a structured data container may automatically update a corresponding field of another instance of the structured data container. Further, in some examples, a selection of a structured data container may cause presentation of an expanded view of the structured data container, as illustrated and described with respect to FIG. 7E, below.

Figure 7B:
FIG. 7B illustrates an example interface usable for updating a field associated with a structured data container via a virtual space.

FIGS. 7A-7E illustrate example interfaces for modifying a structured data container in various virtual spaces. FIG. 7A illustrates and example interface 700a comprising a messaging thread associated with a structured data container, such as messaging thread 702. A messaging thread may include a space of the group-based communication platform presented via a same feed of a different space of the group-based communication platform. In some examples, the messaging thread, such as messaging thread 702, may include data associated with one or more fields of the structured data container. For example, the messaging thread 702 illustrated in interface 700a corresponds to the structured data container associated with the "New Hire Welcome Video," described in FIG. 6. For example, the messaging thread may contain information such as an owner of the structured data container, a status, a due date, a link to content, and audience, for example.

In some examples, the messaging thread may be associated with the structured data container such that modifications to the structured data container may be reflected in the messaging thread, such as a modification to a field associated with the structured data container. Additionally, or alternatively the messaging thread may be configured to receive messages associated with the structured data container, such as via a virtual space to which the structured data container is shared to (e.g., a canvas, a huddle, a channel, a direct message, etc.) Modifications to structured data container via a messaging thread and/or virtual spaces is described with reference to FIG. 7B-7E, below.

Additionally, or alternatively, the messaging thread may be configured to receive messages shared by individuals, wherein the messages are shared directly in the messaging thread. For example, the messaging thread, such as messaging thread 702, may contain one or more messaging boxes, such as message box 704, such that a user may post a message to the messaging thread. Continuing with the "Marketing: Legal Guidelines" illustrative example above, a user associated with the legal team may have questions regarding one or more field of the structured data container associated with the New Hire Welcome Video. Thus, the user (illustrated in the currently embodiment as "A. User") may post a message in the message thread associated with the "New Hire Welcome Video." As illustrated by the message by A. User, users may associate other users with the structured data container, such as by tagging the other users in a message of the messaging thread. In this way, messaging threads provide users of the group-based communication platform the ability to easily and conveniently keep track of updates and notes associated with structured data container(s).

FIG. 7B illustrates an example interface 700b usable for updating a field associated with a structured data container via a virtual space. For example, the interface 700b illustrates the messaging thread 702 associated with the "New Hire Welcome Video" structured data container in association with a channel 706, titled "New Hire Committee." In some examples, as described above, data associated with a structured data container may be updated via any platform of the group-based communication platform. As illustrated in FIG. 7B, and continuing with the illustrative example above, a user associated with the legal team requested information associated with a field of the structured data container. The owner of the structured data container then messaged a team working on the structured data container in the channel "New Hire Committee." Moreover, a team member (B. Goodman) initiated a multimedia collaboration session, such (also referred to herein as a "huddle,") as indicated by interface 708. In some examples, data associated with the virtual space, such as the channel 706 and/or the huddle interface 708, may be associated with the structured data container. For example, and as illustrated in the huddle interface 708, a member of the channel 706 shared a document 710 to the virtual space, during the huddle.

Figure 7C:
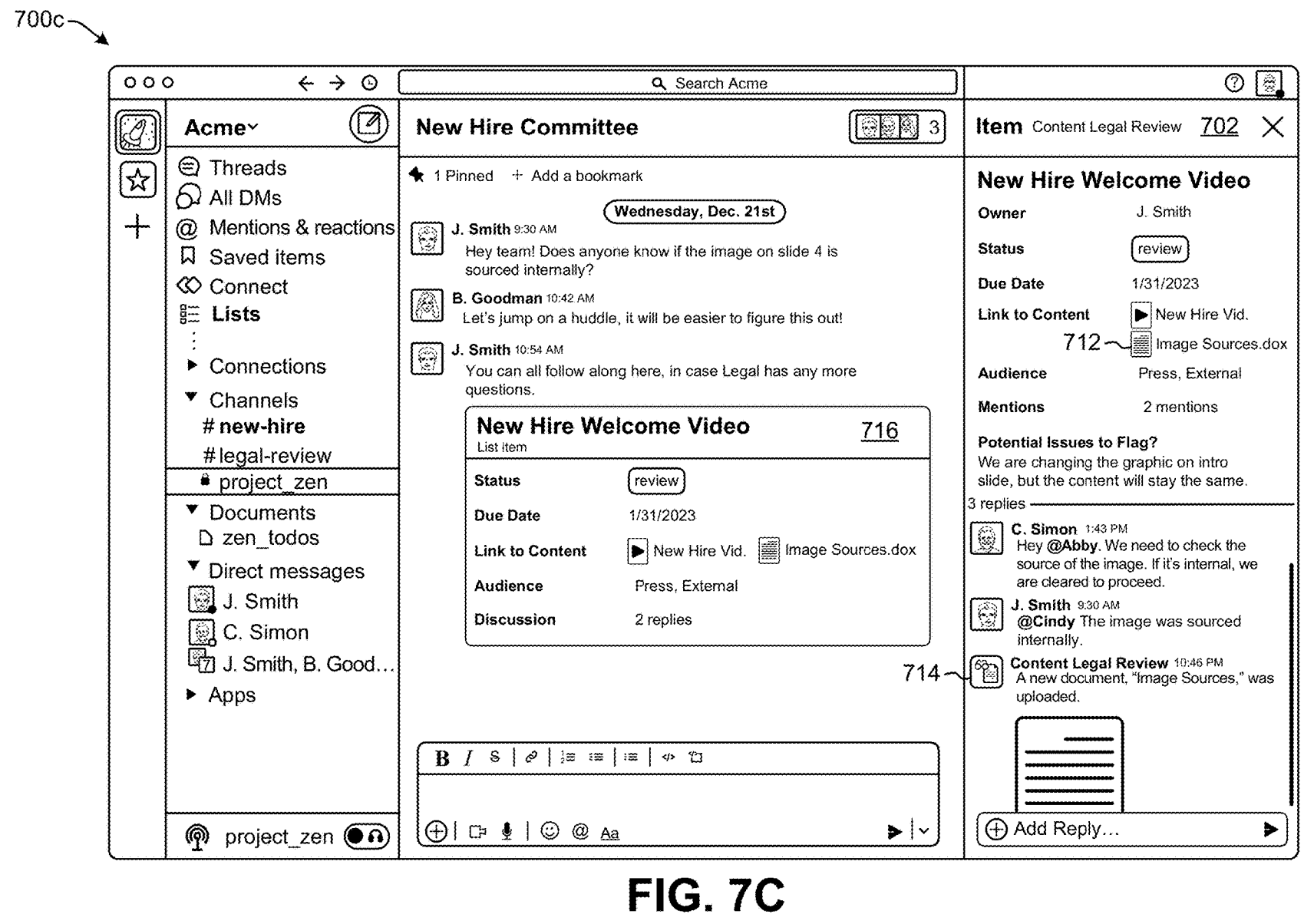

FIG. 7C illustrates an example interface 700c usable for updating a structured data container based on data received from a virtual space associated with the structured data container. In some examples, as illustrated in FIG. 7B, data associated with a structured data container may be updated via any platform of the group-based communication platform. Based at least in part on receiving data associated with a virtual space, the group-based communication platform may send to a messaging thread associated with the structured data container, one or more updates associated with the data. For example, as illustrated in FIG. 7B, the document 710 was shared in a virtual space. Based at least in part on receiving the data, the group-based communication platform may determine that the data is associated with one or more fields of a plurality of fields of a structured data container. The group-based communication platform may then modify, based at least in part on determining that the data is associated with one or more fields of the plurality of fields, the structured data container to contain the data. In some examples, based at least in part on modifying the structured data container, the group-based communication platform may update the messaging thread associated with the structured data container, such as the messaging thread 702. For example, the group-based platform may update, via the messaging thread, data associated with the structured data container, such as one or more fields of the structured data container. For example, based at least in part on receiving the document 710, the group-based communication platform updated the messaging thread 702 to indicate the addition of the document 710, illustrated by the updated link to content 712.

Additionally, or alternatively, the group-based communication platform may send, via the messaging thread, a message associated with the received data. For example, based at least in part on receiving the document 710, the group-based communication platform sent a message 714 to the messaging thread, both indicating that the document 710 was sent to the structured data container and attaching an instance of the document 710 to the messaging thread. By automatically associating data with the messaging thread associated with the structured data container, information and data is kept updated and updated in real-time.

In some examples, an instance of a structured data container may be shared to a virtual space. For example, FIG. 7C illustrates an instance 716 of the New Hire Welcome Video structured data container shared to the New Hire Committee channel. Similar to that discussed above, data associated with the instance 716 of the structured data container may be updated to accurately reflect the structured data container. In the current embodiment, the instance 716 of the structured data container is depicted in a furled version, such that the instance 716 of the structured data container displays a partial amount of the data corresponding to the plurality of fields. Alternatively, an unfurled version of an instance of a structured data container would display the entirety of the data corresponding to the plurality of fields.

Figure 7D:
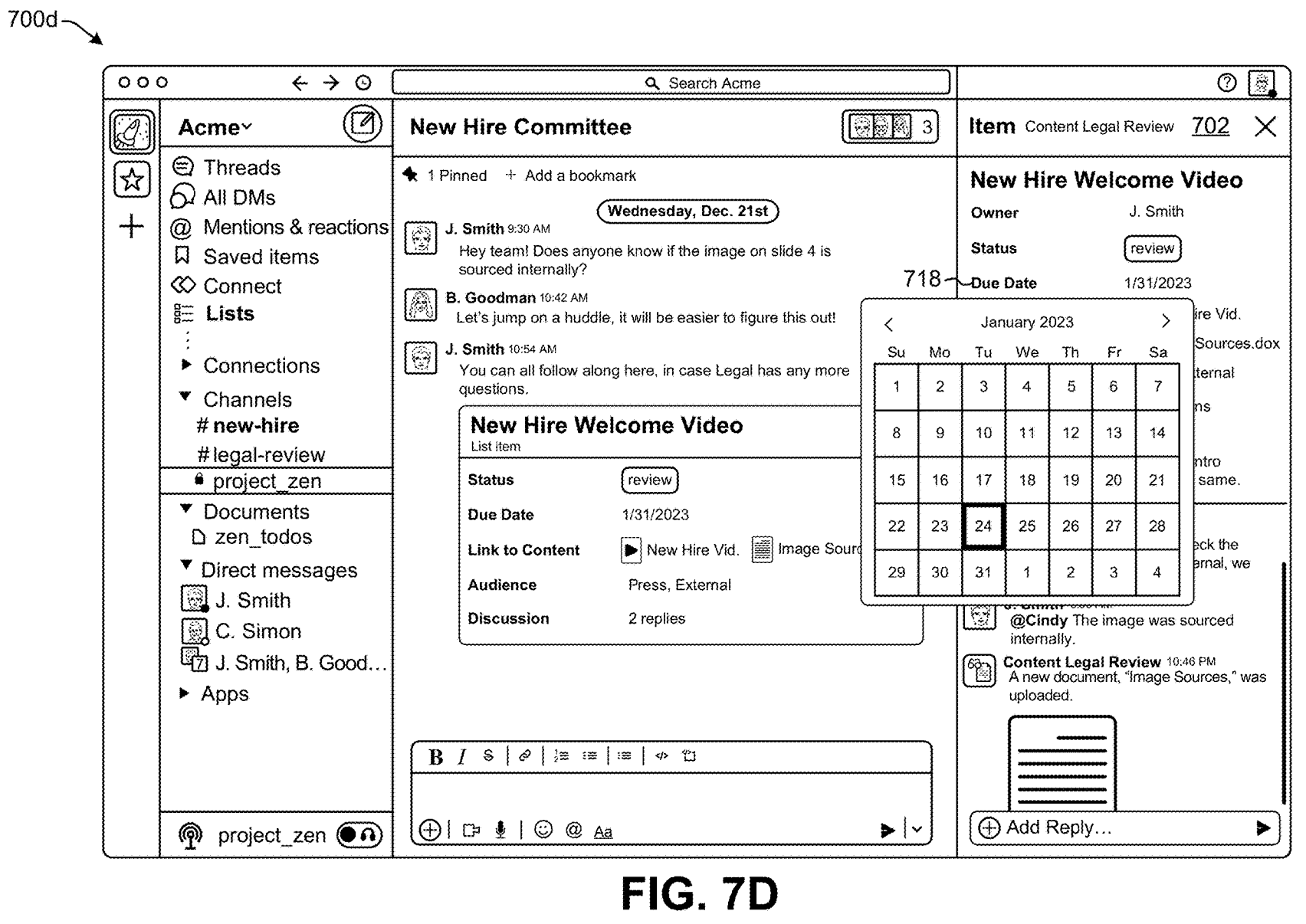

FIG. 7D illustrates an example interface 700d for modifying a field of a structured data container via a messaging thread. In some examples, one or more fields of the plurality of fields of a structured data container may be modified via a messaging thread associated with the structured data container. For example, as illustrated in interface 700d, one or more fields of the plurality of fields associated with the structured data container may be included in the messaging thread associated with the structured data container, such as the due date 718 associated with the messaging thread. In some examples, the due date 718 may be selectable such that, based at least in part on receiving a selection of the due date 718 by a user, the group-based communication platform may cause presentation, to the user, of a calendar. As illustrated in FIG. 7D, the user has selected Jan. 24, 2023 as a modified date. It may be noted that although FIG. 7D illustrates modifying a date, any data associated with any field may be modified via a messaging thread.

Figure 7E:
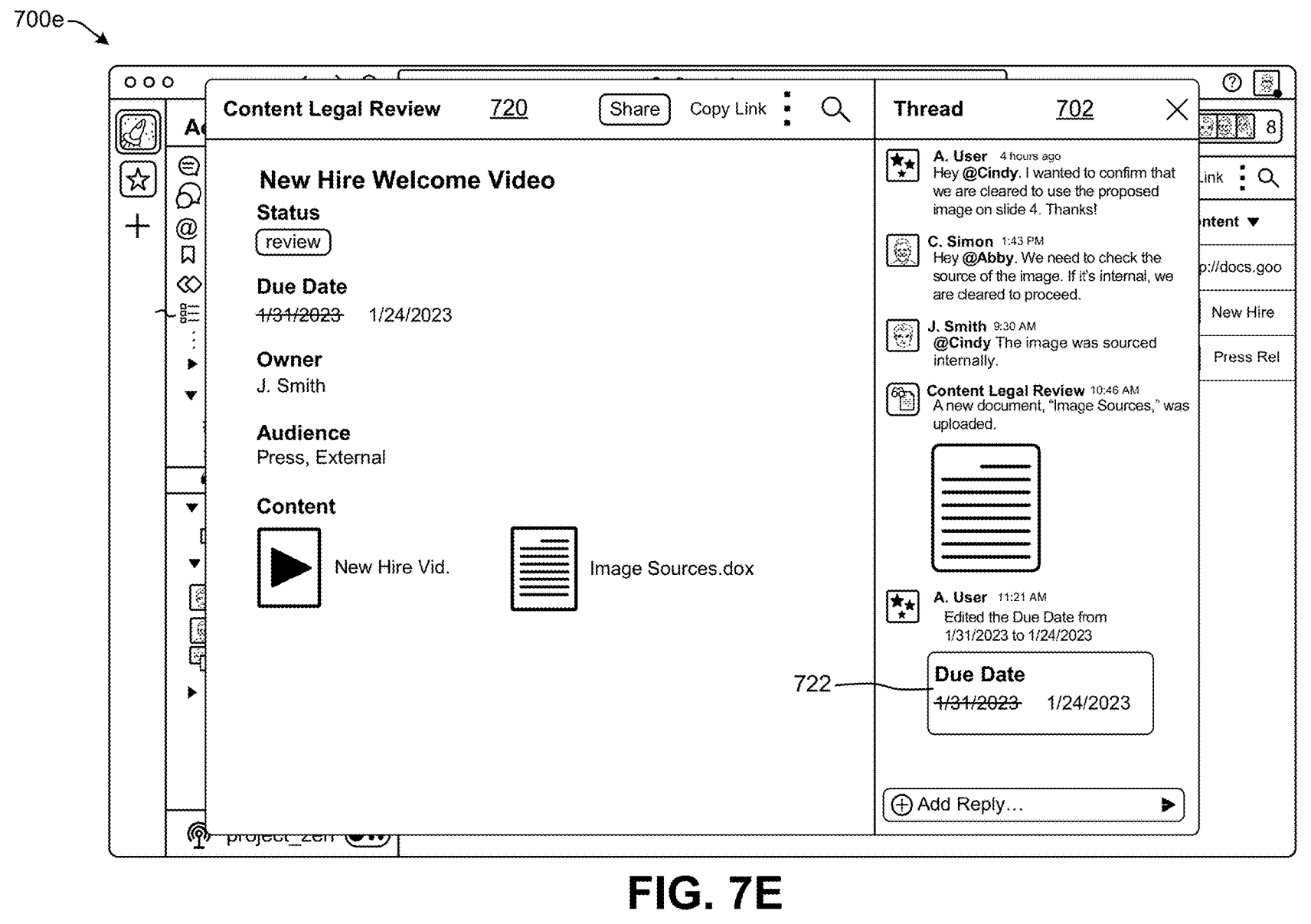

FIG. 7E illustrates an example interface 700e comprising an instance of a structured data container including a modification to a field of the structured data container. For example, the interface 700e may include an interface 720 which may include data associated with one or more fields of a plurality of fields associated with the structured data container. In some examples, the data included in the interface 720 may reflect one or more modifications to the data associated with the one or more fields of the plurality of fields. For example, the messaging thread 702 associated with the structured data container includes a modification 722 indicating the change of the due date.

Figure 8:
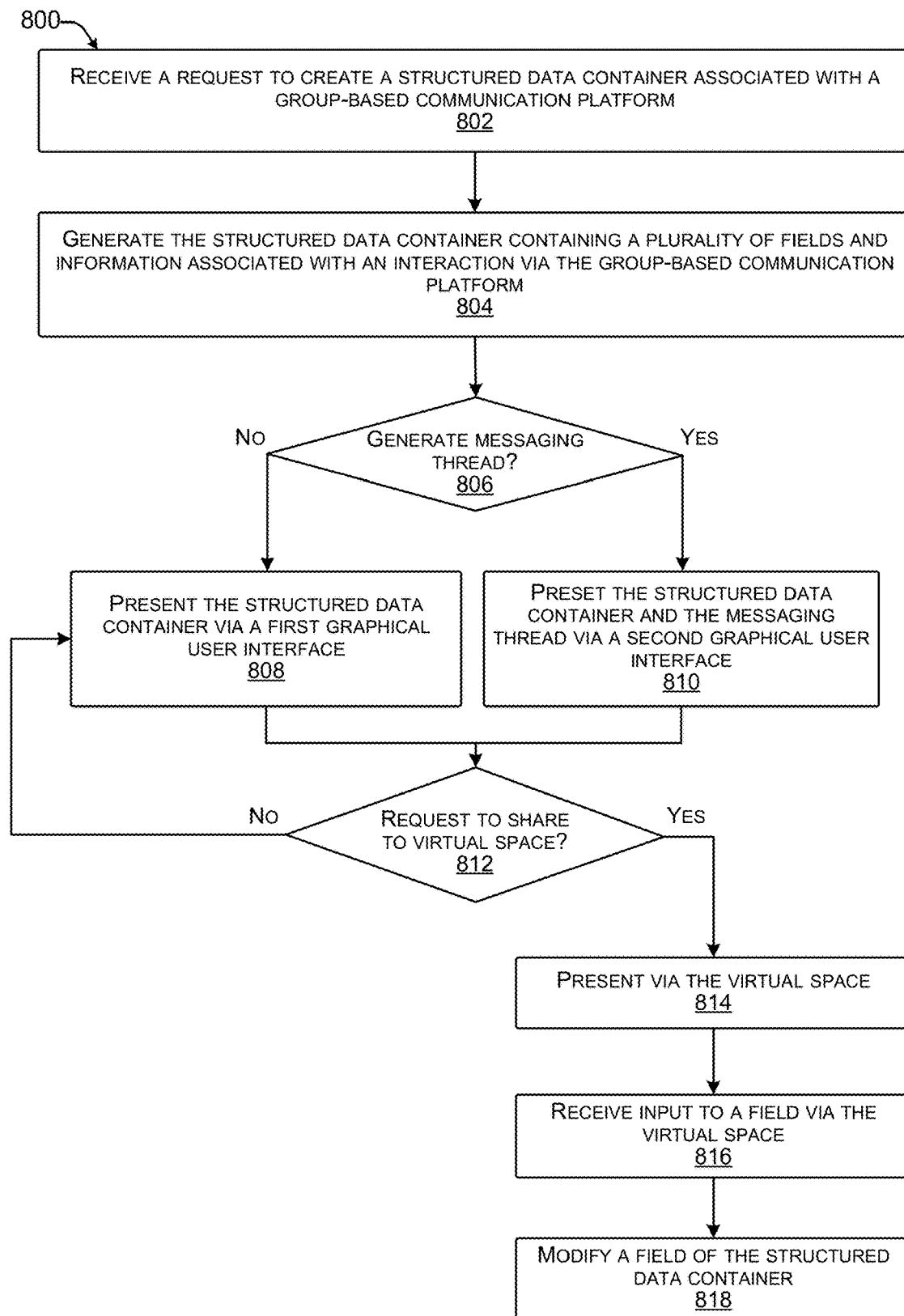
FIG. 8 illustrates a flow diagram of an example process for generating a messaging thread associated with a structured data container and sharing the structured data container to a virtual space.

FIG. 8 illustrates a flow diagram of an example process 800 for generating a messaging thread associated with a structured data container and sharing the structured data container to a virtual space.

For example, at operation 802, the process 800 may include receiving, from a user associated with a group-based communication platform, a request to create a structured data container. The request may be received via any area of the group-based communication platform, such as, for example, via a channel, a huddle, a canvas, a template, a direct message, a list-generation interface, a workflow, or a thread, to name a few non-limiting examples. In some examples, the structured data container may represent a system of record associated with the group-based communication platform.

At operation 804, the process 800 may include, for example, creating, in response to the request, the structured data container. In some examples, the structured data container may comprise at least one field of a plurality of fields. A field may be, for example, an element of the structured data container that may be configured to receive data. For example, a field may be similar to that of a column in a table, in which the individual ones of the fields represent an interaction with the group-based communication platform. Additionally, or alternatively, the structured data container may comprise information associated with an interaction associated with the group-based communication platform.

At operation 806, the process 800 may include determining that a messaging thread has been generated, wherein the messaging thread corresponds to the structured data container. A messaging thread may include a different space of the group-based communication platform presented via a same feed a different space of the group-based communication platform. For example, the messaging thread may be associated with the structured data container such that modifications to the structured data container may be reflected in the messaging thread, such as a modification to a field associated with the structured data container. Additionally, or alternatively the messaging thread may be configured to receive messages associated with the structured data container, such as via a virtual space to which the structured data container is shared to (e.g., a canvas, a huddle, a channel, a direct message, etc.). In other examples, the messaging thread may be configured to receive messages shared by individuals, wherein the messages are shared directly in the messaging thread. In this way, users of the group-based communication platform are able to easily and conveniently keep track of updates and notes associated with the structured data container.

Based at least in part to determining to refrain from generating a messaging thread (e.g., "No" at operation 806), the process 800 may include, at operation 808, presenting the structured data container to the user via a first graphical user interface of the group-based communication platform. In some examples, the structured data container may contain the plurality of fields and the information associated with an interaction via the group-based communication platform, similar to user interface 600 illustrated in FIG. 6.

Alternatively, based at least in part on determining that a messaging thread has been generated (e.g., "Yes" at operation 806), the process 800 may include, at operation 810, presenting the structured data container and the messaging thread via a second graphical user interface. In some examples, the structured data container may contain the plurality of fields and the information associated with an interaction via the group-based communication platform. The graphical user interface may be similar to that depicted in FIGS. 7A-7D.

At operation 812, the process 800 may include determining that the group-based communication platform received a request to share the structured data container to a virtual space. The request to share the structured data container may be received from the user. Alternatively, the request to share the structured data container may be received from any user of the group-based platform with the ability to share the structured data container based on privacy settings associated with the structured data container. In some examples, the virtual space may include any space of the group-based communication platform, such as a channel, a canvas, a huddle, another list or structured data container, or a direct message, to name a few non-limiting examples.

Based at least in part on determining that the group-based communication platform did not receive a request to share the structured data container to a virtual space, the process

800 may return to operation 808, including presenting the structured data container via the first graphical user interface.

Alternatively, based at least in part on determining that the group-based communication platform received a request to share the structured data container to a virtual space, the process 800 may include, at operation 814, presenting the structured data container to the virtual space. According to aspects of this disclosure, the structured data container may contain the plurality of fields and the information associated with an interaction via the group-based communication platform. Additionally, or alternatively, the group-based communication platform may cause the presentation of the messaging thread to the virtual space.

At operation 816, the process 800 may include receiving, from the user, input to a field via the virtual space. For example, the structured data container presented via the virtual space may include one or more fields of the plurality of fields, wherein the fields may be modified by the user.

At operation 818, based at least in part on receiving the input to the field of plurality of fields and via the virtual space, the process 800 may include modifying a field of the structured data container. For example, modifying the field of the structured data container may include modifying the field of the structured data container associated with the field of the virtual space. In this way, multiple instances of the structured data container may be updated in real time, ensuring that all instances of the virtual space are accurate and up to date.

Figure 9:
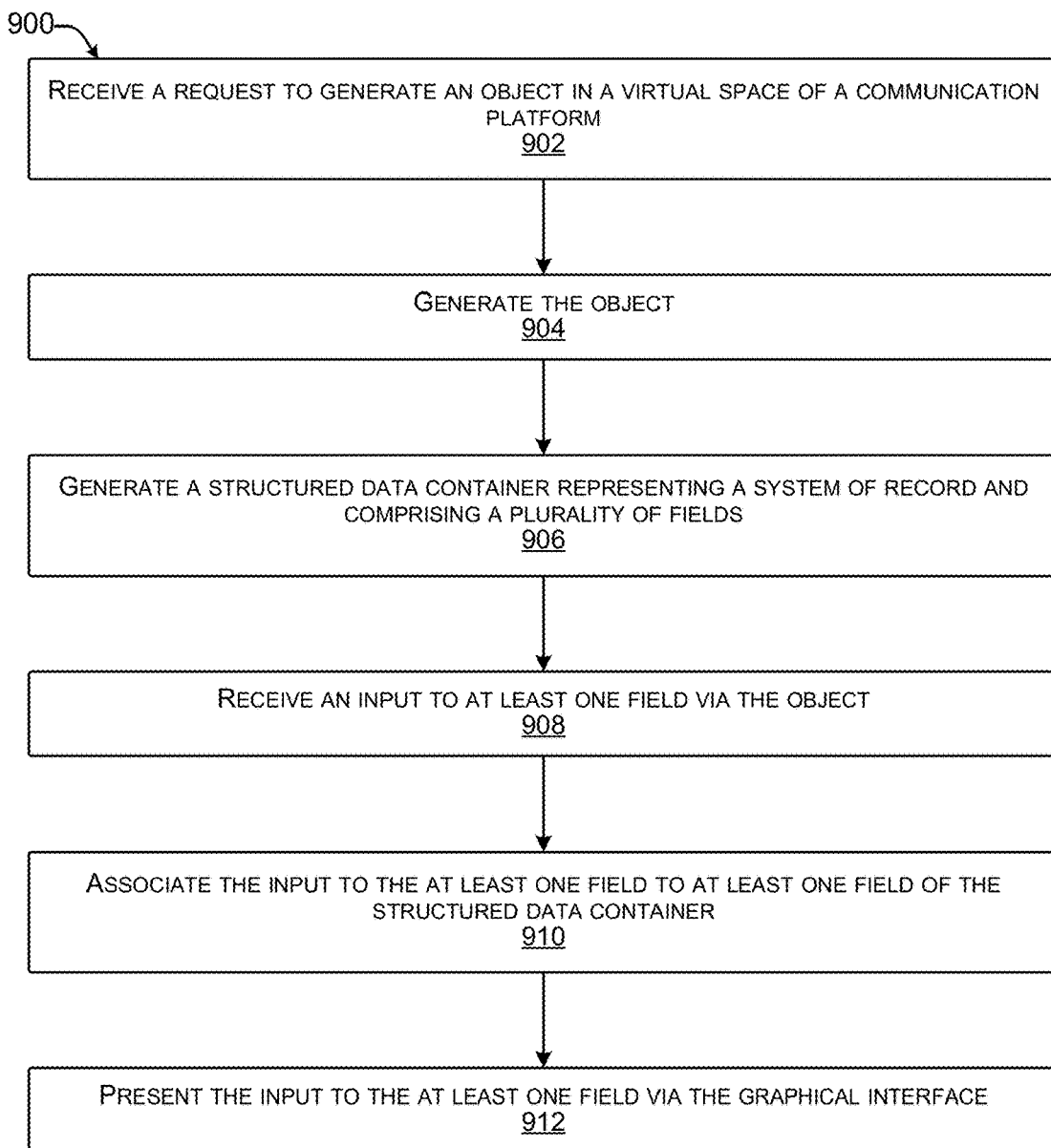
FIG. 9 illustrates a flow diagram of an example process for generating a structured data container via a virtual space of a group-based communication platform.

FIG. 9 illustrates a flow diagram of an example process 900 for generating a structured data container via a virtual space of a group-based communication platform.

For example, at operation 902, the process 900 may include receiving, from a first user associated with the group-based communication platform and via a graphical user interface, a request to generate an object in a virtual space of the communication platform. In some examples, the object contains at least one field of a plurality of fields. The request to generate the object may, in some examples, be received from at least one of a template and/or a workflow. A template may include, for example, a pre-generated data structure that may include one or more fields and one or more settings which may be saved and for future use. Alternatively, a workflow may include an automated, multi-step process which may manage routine and/or repetitious tasks. In some examples, the templates and/or the workflows may be generated by the communication platform.

At operation 904, based at least in part on receiving the request, the process 900 may include generating the object. At operation 904, the process 900 may include, in response to generating the object, generating a structured data container representing a system of record associated with the group-based communication platform. For example, the structured data container may comprise the plurality of fields, such that the data associated with the structured data container corresponds to the data associated with the object in the virtual space. In other words, the plurality of fields associated with the object in the virtual space may be the same as the plurality of fields associated with the structured data container.

At operation 906, the process 900 may include receiving, from a second user associated with the group-based communication platform, an input to at least one field of the plurality of fields. In other words, a first user may generate an object, via a workflow and/or a template, of which the object contains one or more fields in which a second user may enter data.

At operation 908, the process 900 may include associating the input to the at least one field of the plurality of fields to at least one field of the plurality of fields of the structured data container. In other words, the data received from the second user may be associated with corresponding data fields in the structured data container generated by the first account.

At operation 910, the process 900 may include presenting, via the graphical interface and to the first user, the input to at the at least one field of the plurality of fields, thus associating the object to a corresponding workflow.

Example Clauses

A. A: A method, implemented at least in part by one or more computing devices of a group-based communication platform, the method comprising: receiving, from a user associated with the group-based communication platform, a request to create a structured data container representing a system of record associated with the group-based communication platform; generating, in response to the request, the structured data container, the structured data container comprising: a plurality of fields; and information associated with an interaction associated with the group-based communication platform; generating a messaging thread associated with at least one field of the plurality of fields of the structured data container; and presenting, via a graphical user interface, the structured data container representing the system of record including the plurality of fields and the messaging thread associated with the at least one field of the plurality of fields of the structured data container.

B: The method of paragraph A, further comprising: receiving, at a field of the plurality of fields, first information associated with a first interaction associated with the group-based communication platform; receiving, at the field of the plurality of fields, second information associated with a second interaction associated with the group-based communication platform, wherein the second interaction represents one or more changes to the first interaction; and causing presentation, via the messaging thread associated with the at least one field of the plurality of fields and based at least in part on receiving the second information, first metadata associated with the first information and second metadata associated with the second information, wherein the second metadata includes an indication of the one or more changes to the first information.

C: The method of paragraph B, further comprising: receiving, via the messaging thread associated with the at least one field of the plurality of fields, text input associated with at least one of the first metadata or the second metadata, the text input comprising a user identifier and message data; and presenting, via the messaging thread associated with the at least one field of the plurality of fields, of the text input comprising the user identifier and the message data.

D: The method of paragraph A, wherein the messaging thread associated with the at least one field of the plurality of fields is a first messaging thread associated with a first field, the method further comprising: receiving, at a second field of the plurality of fields, information associated with an interaction via the group-based communication platform; and causing presentation, via a second messaging thread associated with the second field of the plurality of fields, of the information associated with the interaction associated with the group-based communication platform.

E: The method of paragraph A, further comprising: causing presenting, based at least in part to the request to create the structured data container, a plurality of structured data templates; receiving a selection of an individual structured data template of the plurality of structured data templates; and generating, based at least in part on receiving the selection of the individual structured data template, the structured data representing the system of record.

F: The method of paragraph A, wherein the structured data container includes one or more options associated with receiving a selection of a data category from a plurality of data categories, the data categories including at least one of: a task title; a description; a status; an issue type; a date submitted; a due date; an owner; a creator; a thread; an audience; a content item; or a rating.

G: The method of paragraph A, wherein the graphical user interface is a first graphical user interface, the method further comprising: receiving a request to share the structured data container to a virtual space of the group-based communication platform, wherein the virtual space is a second graphical user interface; and causing presentation, in the virtual space, of one or more selectable objects associated with the structured data container.

H: The method of paragraph G, further comprising: receiving an indication of a selection of the one or more selectable objects associated with the structured data container; and causing presentation, based at least in part on the selection of the one or more selectable objects and via the second graphical user interface, of an unfurled view of the structured data container.

I: The method of paragraph A, wherein the structured data container is associated with a set of permissions configured to limit a visibility of the at least one field of the plurality of fields associated with the group-based communication platform.

J: The method of paragraph A, the method further comprising: receiving, via the graphical user interface, a selection of one or more options associated with filtering the plurality of fields, the one or more options including at least one of: a date; a status; a user response; a user account; or content type; and presenting, based at least in part on receiving the selection, of a filtered view of the plurality of fields.

K: A system comprising: one or more processors; and one or more non-transitory computer-readable media comprising instructions that, when executed by the one or more processors, cause the system to perform operations comprising: receiving, from a user associated with a group-based communication platform, a request to create a structured data container representing a system of record associated with the group-based communication platform; generating, in response to the request, the structured data container, the structured data container comprising: a plurality of fields; and information associated with an interaction associated with the group-based communication platform; generating a messaging thread associated with at least one field of the plurality of fields of the structured data container; and presenting, via a graphical user interface, the structured data container representing the system of record including the plurality of fields and the messaging thread associated with the at least one field of the plurality of fields of the structured data container.

L: The system of paragraph K, the operations further comprising: receiving, at a field of the plurality of fields, first information associated with a first interaction associated with the group-based communication platform; receiving, at the field of the plurality of fields, second information associated with a second interaction associated with the group-based communication platform, wherein the second interaction represents one or more changes to the first interaction; and causing presentation, via the messaging thread associated with the at least one field of the plurality of fields and based at least in part on receiving the second information, first metadata associated with the first information and second metadata associated with the second information, wherein the second metadata includes an indication of the one or more changes to the first information.

M: The system of paragraph L, the operations further comprising: receiving, via the messaging thread associated with the at least one field of the plurality of fields, text input associated with at least one of the first metadata or the second metadata, the text input comprising a user identifier and message data; and presenting, via the messaging thread associated with the at least one field of the plurality of fields, of the text input comprising the user identifier and the message data.

N: The system of paragraph K, wherein the messaging thread associated with the at least one field of the plurality of fields is a first messaging thread associated with a first field, the operations further comprising: receiving, at a second field of the plurality of fields, information associated with an interaction via the group-based communication platform; and causing presentation, via a second messaging thread associated with the second field of the plurality of fields, of the information associated with the interaction associated with the group-based communication platform.

O: The system of paragraph K, the operations further comprising: causing presenting, based at least in part to the request to create the structured data container, a plurality of structured data templates; receiving a selection of an individual structured data template of the plurality of structured data templates; and generating, based at least in part on receiving the selection of the individual structured data template, the structured data representing the system of record.

P: The system of paragraph K, wherein the structured data container includes one or more options associated with receiving a selection of a data category from a plurality of data categories, the data categories including at least one of: a task title; a description; a status; an issue type; a date submitted; a due date; an owner; a creator; a thread; an audience; a content item; or a rating.

Q: One or more computer-readable media comprising instructions that, when executed by one or more processors, cause the one or more processors to perform operations comprising: receiving, from a user associated with a group-based communication platform, a request to create a structured data container representing a system of record associated with the group-based communication platform; generating, in response to the request, the structured data container, the structured data container comprising: a plurality of fields; and information associated with an interaction associated with the group-based communication platform; generating a messaging thread associated with at least one field of the plurality of fields of the structured data container; and presenting, via a graphical user interface, the structured data container representing the system of record including the plurality of fields and the messaging thread associated with the at least one field of the plurality of fields of the structured data container.

R: The one or more computer-readable media of paragraph Q, wherein the graphical user interface is a first graphical user interface, the operations further comprising: receiving a request to share the structured data container to a virtual space of the group-based communication platform, wherein the virtual space is a second graphical user interface; and causing presentation, in the virtual space, of one or more selectable objects associated with the structured data container.

S: The one or more computer-readable media of paragraph R, the operations further comprising: receiving an indication of a selection of the one or more selectable objects associated with the structured data container; and causing presentation, based at least in part on the selection of the one or more selectable objects and via the second graphical user interface, of an unfurled view of the structured data container.

T: The one or more computer-readable media of paragraph Q, wherein the structured data container is associated with a set of permissions configured to limit a visibility of the at least one field of the plurality of fields associated with the group-based communication platform.

U: A method, implemented at least in part by one or more computing devices of a group-based communication platform, the method comprising: receiving, from a user associated with the group-based communication platform, a request to create a structured data container representing a system of record associated with the group-based communication platform; generating, in response to the request, the structured data container, the structured data container comprising: a plurality of fields; and information associated with an interaction associated with the group-based communication platform; presenting, via a first graphical user interface, the structured data container representing the system of record including the plurality of fields; receiving, from the user, a request to share at least one field of the plurality of fields to a virtual space of the group-based communication platform, wherein the virtual space is a second graphical user interface; presenting, via the virtual space of the group-based communication platform, the at least one field of the plurality of fields; receiving, from the user and via the virtual space of the group-based communication platform, an input to at least one field of the plurality of fields, wherein the input includes information associated with an interaction associated with the group-based communication platform; and modifying the at least one field of the plurality of fields of the structured data container based at least in part on receiving the input to the at least one field of the plurality of fields via the virtual space of the group-based communication platform.

V: The method of paragraph U, further comprising: generating a messaging thread associated with at least one field of the plurality of fields of the structured data container; and presenting, via the second graphical user interface, the messaging thread associated with the at least one field of the plurality of fields of the structured data container.

W: The method of paragraph U, wherein the virtual space includes at least one of: a channel, a canvas; a huddle; or a direct message.

X: The method of paragraph U, wherein the virtual space includes one or selectable objects associated with the at least one field of the plurality of fields, the method further comprising: receiving an indication of a selection of the one or more selectable objects associated with the structured data container; and causing presentation, based at least in part on the selection of the one or more selectable objects and via the virtual space, of an unfurled view of the structured data container.

Y: The method of paragraph U, wherein the input to at least one field of the plurality of fields is a first input to a first field of the plurality of fields the method further comprising: receiving, at the field of the plurality of fields and via the virtual space, second information associated with a second interaction associated with the group-based communication platform, wherein the second interaction includes one or more changes to first interaction data; and modifying the field of the plurality of fields via the structured data container based at least in part on receiving second interaction data.

Z: The method of paragraph Y, further comprising: presenting, via a messaging thread associated with the at least one field of the plurality of fields based at least in part on receiving the second information, first metadata associated with first information and second metadata associated with the second information, wherein the second metadata includes an indication of the one or more changes to the first information.

AA: The method of paragraph U, wherein the virtual space is a first virtual space, the method further comprising: receiving, from the user, a request to share at least one field of the plurality of fields to a second virtual space of the group-based communication platform, wherein the second virtual space is a third graphical user interface; and presenting, via the second virtual space of the group-based communication platform, the at least one field of the plurality of fields.

AB: The method of paragraph AA, wherein the input is a first input, and the interaction is a first interaction, the method further comprising: receiving, from the user and via the second virtual space of the group-based communication platform, a second input to at least one field of the plurality of fields, wherein the second input includes information associated with a second interaction associated with the group-based communication platform; and modifying the at least one field of the plurality of fields of the structured data container based at least in part on receiving the second input to the at least one field of the plurality of fields via the second virtual space of the group-based communication platform.

AC: A system comprising: one or more processors; and one or more non-transitory computer-readable media comprising instructions that, when executed by the one or more processors, cause the system to perform operations comprising: receiving, from a user associated with a group-based communication platform, a request to create a structured data container representing a system of record associated with the group-based communication platform; generating, in response to the request, the structured data container, the structured data container comprising: a plurality of fields; and information associated with an interaction associated with the group-based communication platform; presenting, via a first graphical user interface, the structured data container representing the system of record including the plurality of fields; receiving, from the user, a request to share at least one field of the plurality of fields to a virtual space of the group-based communication platform, wherein the virtual space is a second graphical user interface; presenting, via the virtual space of the group-based communication platform, the at least one field of the plurality of fields; receiving, from the user and via the virtual space of the group-based communication platform, an input to at least one field of the plurality of fields, wherein the input includes information associated with an interaction associated with the group-based communication platform; and modifying the at least one field of the plurality of fields of the structured data container based at least in part on receiving the input to the at least one field of the plurality of fields via the virtual space of the group-based communication platform.

AD: The system of paragraph AC, the operations further comprising: generating, a messaging thread associated with at least one field of the plurality of fields of the structured data container; and presenting, via the second graphical user interface, the messaging thread associated with the at least one field of the plurality of fields of the structured data container.

AE: The system of paragraph AC, wherein the virtual space includes at least one of: a channel, a canvas; a huddle; or a direct message.

AF: The system of paragraph AC, wherein the virtual space includes one or selectable objects associated with the at least one field of the plurality of fields, the operations further comprising: receiving an indication of a selection of the one or more selectable objects associated with the structured data container; and causing presentation, based at least in part on the selection of the one or more selectable objects and via the virtual space, of an unfurled view of the structured data container.

AG: The system of paragraph AC, wherein the input to at least one field of the plurality of fields is a first input to a first field of the plurality of fields, the operations further comprising: receiving, at the field of the plurality of fields and via the virtual space, second information associated with a second interaction associated with the group-based communication platform, wherein the second interaction includes one or more changes to first interaction data; and modifying the field of the plurality of fields via the structured data container based at least in part on receiving second interaction data.

AH: The system of paragraph AG, the operations further comprising: presenting, via a messaging thread associated with the at least one field of the plurality of fields based at least in part on receiving the second information, first metadata associated with the first information and second metadata associated with the second information, wherein the second metadata includes an indication of the one or more changes to the first information.

AI: One or more computer-readable media comprising instructions that, when executed by one or more processors, cause the one or more processors to perform operations comprising: receiving, from a user associated with a group-based communication platform, a request to create a structured data container representing a system of record associated with the group-based communication platform; generating, in response to the request, the structured data container, the structured data container comprising: a plurality of fields; and information associated with an interaction associated with the group-based communication platform; presenting, via a first graphical user interface, the structured data container representing the system of record including the plurality of fields; receiving, from the user, a request to share at least one field of the plurality of fields to a virtual space of the group-based communication platform, wherein the virtual space is a second graphical user interface; presenting, via the virtual space of the group-based communication platform, the at least one field of the plurality of fields; receiving, from the user and via the virtual space of the group-based communication platform, an input to at least one field of the plurality of fields, wherein the input includes information associated with an interaction associated with the group-based communication platform; and modifying the at least one field of the plurality of fields of the structured data container based at least in part on receiving the input to the at least one field of the plurality of fields via the virtual space of the group-based communication platform.

AJ: The one or more computer-readable media of paragraph AI, wherein the virtual space is a first virtual space, the operations further comprising: receiving, from the user, a request to share at least one field of the plurality of fields to a second virtual space of the group-based communication platform, wherein the second virtual space is a third graphical user interface; and presenting, via the second virtual space of the group-based communication platform, the at least one field of the plurality of fields.

AK: The one or more computer-readable media of paragraph AJ, wherein the input is a first input, and the interaction is a first interaction, the operations further comprising: receiving, from the user and via the second virtual space of the group-based communication platform, a second input to at least one field of the plurality of fields, wherein the second input includes information associated with a second interaction associated with the group-based communication platform; and modifying the at least one field of the plurality of fields of the structured data container based at least in part on receiving the second input to the at least one field of the plurality of fields via the second virtual space of the group-based communication platform.

AL: The one or more computer-readable media of paragraph AI, the operations further comprising: generating, a messaging thread associated with at least one field of the plurality of fields of the structured data container; and presenting, via the second graphical user interface, the messaging thread associated with the at least one field of the plurality of fields of the structured data container.

AM: The one or more computer-readable media of paragraph AI, wherein the virtual space includes at least one of: a channel, a canvas; a huddle; or a direct message.

AN: The one or more computer-readable media of paragraph AI, wherein the virtual space includes one or selectable objects associated with the at least one field of the plurality of fields, the operations further comprising: receiving an indication of a selection of the one or more selectable objects associated with the structured data container; and causing presentation, based at least in part on the selection of the one or more selectable objects and via the virtual space, of an unfurled view of the structured data container.

AO: A method, implemented at least in part by one or more computing devices of a group-based communication platform, the method comprising: receiving, from a first user associated with the group-based communication platform and via a graphical user interface, a request to generate an object in a virtual space of the group-based communication platform, wherein the request is received from at least one of a template or a workflow, and wherein the object contains at least one field of a plurality of fields; generating, in response to the request, the object; generating, in response to generating the object, a structured data container representing a system of record associated with the group-based communication platform, the structured data container comprising the plurality of fields; receiving, from a second user associated with the group-based communication platform and via the object, an input to at least one field of plurality of fields; associating the input to the at least one field of the plurality of fields to at least one field of the plurality of fields of the structured data container; and presenting, via the graphical user interface and to the first user, the input to the at least one field of the plurality of fields.

AP: The method of paragraph AO, wherein the virtual space is a first virtual space, the method further comprising: receiving, from the first user, a request to share the object to a second virtual space of the group-based communication platform, wherein the second virtual space is different from the first virtual space; and presenting, via the second virtual space of the group-based communication platform, the object.

AQ: The method of paragraph AO, further comprising: receiving, at the virtual space and from the second user, a request to launch a multimedia collaboration session associated with the object; and launching a multimedia collaboration session associated with the object, wherein the multimedia collaboration session enables two or more users associated with the group-based communication platform to simultaneously access the object.

AR: The method of paragraph AQ, further comprising: receiving, from at least one of two or more users associated with the group-based communication platform, data associated with the object; associating the data associated with the object with at least field of the plurality of fields of the structured data container; and presenting, via the graphical user interface and to the first user, the data associated with the object.

AS: The method of paragraph AO, wherein the template or the workflow is generated by the group-based communication platform.

AT: The method of paragraph AO, wherein the input is a first input, the method further comprising: receiving, from the second user, a second input to at least one field of the plurality of fields; associating the second input to the at least one field of the plurality of fields to at least one field of the plurality of fields of the structured data container; and presenting, via the graphical user interface and to the first user, the second input to the at least one field of the plurality of fields.

AU: The method of paragraph AO, wherein the graphical interface is a first graphical interface, the method further comprising: generating a messaging thread associated with at least one field of the plurality of fields of the structured data container; and presenting, via at least one of the first graphical interface or a second graphical interface, the messaging thread associated with the at least one field of the plurality of fields of the structured data container.

AV: The method of paragraph AO, wherein the structured data container is associated with a set of permissions configured to limit a visibility of the at least one field of the plurality of fields associated with the group-based communication platform.

AW: A system comprising: one or more processors; and one or more non-transitory computer-readable media comprising instructions that, when executed by the one or more processors, cause the system to perform operations comprising: receiving, from a first user associated with the group-based communication platform and via a graphical user interface, a request to generate an object in a virtual space of the group-based communication platform, wherein the request is received from at least one of a template or a workflow, and wherein the object contains at least one field of a plurality of fields; generating, in response to the request, the object; generating, in response to generating the object, a structured data container representing a system of record associated with the group-based communication platform, the structured data container comprising the plurality of fields; receiving, from a second user associated with the group-based communication platform and via the object, an input to at least one field of plurality of fields; associating the input to the at least one field of the plurality of fields to at least one field of the plurality of fields of the structured data container; and presenting, via the graphical user interface and to the first user, the input to the at least one field of the plurality of fields.

AX: The system of paragraph AW, wherein the virtual space is a first virtual space, the operations further comprising: receiving, from the first user, a request to share the object to a second virtual space of the group-based communication platform, wherein the second virtual space is different from the first virtual space; and presenting, via the second virtual space of the group-based communication platform, the object.

AY: The system of paragraph AW, the operations further comprising: receiving, at the virtual space and from the second user, a request to launch a multimedia collaboration session associated with the object; and launching a multimedia collaboration session associated with the object, wherein the multimedia collaboration session enables two or more users associated with the group-based communication platform to simultaneously access the object.

AZ: The system of paragraph AY, the operations further comprising: receiving, from at least one of two or more users associated with the group-based communication platform, data associated with the object; associating the data associated with the object with at least field of the plurality of fields of the structured data container; and presenting, via the graphical user interface and to the first user, the data associated with the object.

BA: The system of paragraph AW, wherein the template or the workflow is generated by the group-based communication platform.

BB: The system of paragraph AW, wherein the input is a first input, the method further comprising: receiving, from the second user, a second input to at least one field of the plurality of fields; associating the second input to the at least one field of the plurality of fields to at least one field of the plurality of fields of the structured data container; and presenting, via the graphical user interface and to the first user, the second input to the at least one field of the plurality of fields.

BC: One or more computer-readable media comprising instructions that, when executed by one or more processors, cause the one or more processors to perform operations comprising: receiving, from a first user associated with the group-based communication platform and via a graphical user interface, a request to generate an object in a virtual space of the group-based communication platform, wherein the request is received from at least one of a template or a workflow, and wherein the object contains at least one field of a plurality of fields; generating, in response to the request, the object; generating, in response to generating the object, a structured data container representing a system of record associated with the group-based communication platform, the structured data container comprising the plurality of fields; receiving, from a second user associated with the group-based communication platform and via the object, an input to at least one field of plurality of fields; associating the input to the at least one field of the plurality of fields to at least one field of the plurality of fields of the structured data container; and presenting, via the graphical user interface and to the first user, the input to the at least one field of the plurality of fields.

BD: The one or more computer-readable media of paragraph BC, wherein the graphical interface is a first graphical interface, the operations further comprising: generating a messaging thread associated with at least one field of the plurality of fields of the structured data container; and presenting, via at least one of the first graphical interface or a second graphical interface, the messaging thread associated with the at least one field of the plurality of fields of the structured data container.

BE: The one or more computer-readable media of paragraph BC, wherein the structured data container is associated with a set of permissions configured to limit a visibility of the at least one field of the plurality of fields associated with the group-based communication platform.

BF: The one or more computer-readable media of paragraph BC, wherein the virtual space is a first virtual space, the operations further comprising: receiving, from the first user, a request to share the object to a second virtual space of the group-based communication platform, wherein the second virtual space is different from the first virtual space; and presenting, via the second virtual space of the group-based communication platform, the object.

BG: The one or more computer-readable media of paragraph BC, the operations further comprising: receiving, at the virtual space and from the second user, a request to launch a multimedia collaboration session associated with the object; and launching a multimedia collaboration session associated with the object, wherein the multimedia collaboration session enables two or more users associated with the group-based communication platform to simultaneously access the object.

BH: The one or more computer-readable media of paragraph BG, the operations further comprising: receiving, from at least one of two or more users associated with the group-based communication platform, data associated with the object; associating the data associated with the object with at least field of the plurality of fields of the structured data container; and presenting, via the graphical user interface and to the first user, the data associated with the object.

While the example clauses described above are described with respect to one particular implementation, it should be understood that, in the context of this document, the content of the example clauses can also be implemented via a method, device, system, a computer-readable medium, and/or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A method, implemented at least in part by one or more computing devices of a group-based communication platform, the method comprising:
    receiving, from a user associated with the group-based communication platform, a request to create a structured data container representing a system of record associated with an interaction via a virtual space of the group-based communication platform;
    causing presentation, based at least in part on the request to create the structured data container, of a plurality of structured data templates;
    receiving a selection of an individual structured data template of the plurality of structured data templates;
    generating, at least partly in response to the request and in response to receiving the selection of the individual structured data template, the structured data container, the structured data container comprising a plurality of fields wherein at least one field of the plurality of fields contains information associated with the system of record associated with the interaction via the virtual space of the group-based communication platform;
    wherein the plurality of fields contain information collected across multiple virtual spaces;
    generating a messaging thread associated with at least one field of the plurality of fields of the structured data container;
    presenting, via a first graphical user interface, the structured data container representing the system of record including the plurality of fields and the messaging thread associated with the at least one field of the plurality of fields of the structured data container;
    receiving a request to share the structured data container to a second virtual space of the group-based communication platform, wherein the second virtual space is a second graphical user interface; and
    causing presentation, in the second virtual space, of one or more selectable objects associated with the structured data container.

2. The method of claim 1, further comprising:
    receiving, at a field of the plurality of fields, first information associated with a first interaction associated with the group-based communication platform;
    receiving, at the field of the plurality of fields, second information associated with a second interaction associated with the group-based communication platform, wherein the second interaction represents one or more changes to the first interaction; and
    causing presentation, via the messaging thread associated with the at least one field of the plurality of fields and based at least in part on receiving the second information, first metadata associated with the first information and second metadata associated with the second information, wherein the second metadata includes an indication of the one or more changes to the first information.

3. The method of claim 2, further comprising:
    receiving, via the messaging thread associated with the at least one field of the plurality of fields, text input associated with at least one of the first metadata or the second metadata, the text input comprising a user identifier and message data; and
    presenting, via the messaging thread associated with the at least one field of the plurality of fields, of the text input comprising the user identifier and the message data.

4. The method of claim 1, wherein the messaging thread associated with the at least one field of the plurality of fields is a first messaging thread associated with a first field, the method further comprising:
- receiving, at a second field of the plurality of fields, information associated with an interaction via the group-based communication platform; and
- causing presentation, via a second messaging thread associated with the second field of the plurality of fields, of the information associated with the interaction associated with the group-based communication platform.

5. The method of claim 1, wherein the structured data container includes one or more options associated with receiving a selection of a data category from a plurality of data categories, the data categories including at least one of:
- a task title;
- a description;
- a status;
- an issue type;
- a date submitted;
- a due date;
- an owner;
- a creator;
- a thread;
- an audience;
- a content item; or
- a rating.

6. The method of claim 1, further comprising:
- receiving an indication of a selection of the one or more selectable objects associated with the structured data container; and
- causing presentation, based at least in part on the selection of the one or more selectable
- objects and via the second graphical user interface, of an unfurled view of the structured data container.

7. The method of claim 1, wherein the structured data container is associated with a set of permissions configured to limit a visibility of the at least one field of the plurality of fields associated with the group-based communication platform.

8. The method of claim 1, the method further comprising:
- receiving, via the first graphical user interface, a selection of one or more options associated with filtering the plurality of fields, the one or more options including at least one of:
  - a date;
  - a status;
  - a user response;
  - a user account; or
  - content type; and
- presenting, based at least in part on receiving the selection, of a filtered view of the plurality of fields.

9. The method of claim 1, wherein the system of record is associated with a data management scheme associated with an organization.

10. A system comprising:
- one or more processors; and
- one or more non-transitory computer-readable media comprising instructions that, when executed by the one or more processors, cause the system to perform operations comprising:
  - receiving, from a user associated with a group-based communication platform, a request to create a structured data container representing a system of record associated with an interaction via a virtual space of the group-based communication platform;
  - causing presentation, based at least in part on the request to create the structured data container, of a plurality of structured data templates;
  - receiving a selection of an individual structured data template of the plurality of structured data templates;
  - generating, at least partially in response to the request and in response to receiving the selection of the individual structured data template, the structured data container, the structured data container comprising a plurality of fields wherein at least one field of the plurality of fields contains information associated with the system of record associated with the interaction via the virtual space of the group-based communication platform;
  - wherein the plurality of fields contain information collected across multiple virtual spaces;
  - generating a messaging thread associated with at least one field of the plurality of fields of the structured data container;
  - presenting, via a first graphical user interface, the structured data container representing the system of record including the plurality of fields and the messaging thread associated with the at least one field of the plurality of fields of the structured data container;
  - receiving a request to share the structured data container to a second virtual space of the group-based communication platform, wherein the second virtual space is a second graphical user interface; and
  - causing presentation, in the second virtual space, of one or more selectable objects associated with the structured data container.

11. The system of claim 10, the operations further comprising:
- receiving, at a field of the plurality of fields, first information associated with a first interaction associated with the group-based communication platform;
- receiving, at the field of the plurality of fields, second information associated with a second interaction associated with the group-based communication platform, wherein the second interaction represents one or more changes to the first interaction; and
- causing presentation, via the messaging thread associated with the at least one field of the plurality of fields and based at least in part on receiving the second information, first metadata associated with the first information and second metadata associated with the second information, wherein the second metadata includes an indication of the one or more changes to the first information.

12. The system of claim 11, the operations further comprising:
- receiving, via the messaging thread associated with the at least one field of the plurality of fields, text input associated with at least one of the first metadata or the second metadata, the text input comprising a user identifier and message data; and
- presenting, via the messaging thread associated with the at least one field of the plurality of fields, of the text input comprising the user identifier and the message data.

13. The system of claim 10, wherein the messaging thread associated with the at least one field of the plurality of fields is a first messaging thread associated with a first field, the operations further comprising:
- receiving, at a second field of the plurality of fields, information associated with an interaction via the group-based communication platform; and causing presentation, via a second messaging thread associated with the second field of the plurality of fields, of the information associated with the interaction associated with the group-based communication platform.

14. The system of claim 10, wherein the structured data container includes one or more options associated with receiving a selection of a data category from a plurality of data categories, the data categories including at least one of:
a task title;
a description;
a status;
an issue type;
a date submitted;
a due date;
an owner;
a creator;
a thread;
an audience;
a content item; or
a rating.

15. One or more non-transitory computer-readable storage media comprising instructions that, when executed by one or more processors, cause the one or more processors to perform operations comprising:
receiving, from a user associated with a group-based communication platform, a request to create a structured data container representing a system of record associated with an interaction via a virtual space of the group-based communication platform;
causing presentation, based at least in part on the request to create the structured data container, of a plurality of structured data templates;
receiving a selection of an individual structured data template of the plurality of structured data templates;
generating, at least partially in response to the request and to receiving the selection of the individual structured data template, the structured data container, the structured data container comprising a plurality of fields wherein at least one field of the plurality of fields contains information associated with the system of record associated with the interaction via the virtual space of the group-based communication platform;
wherein the plurality of fields contain information collected across multiple virtual spaces;
generating a messaging thread associated with at least one field of the plurality of fields of the structured data container;
presenting, via a first graphical user interface, the structured data container representing the system of record including the plurality of fields and the messaging thread associated with the at least one field of the plurality of fields of the structured data container;
receiving a request to share the structured data container to a second virtual space of the group-based communication platform, wherein the second virtual space is a second graphical user interface; and
causing presentation, in the second virtual space, of one or more selectable objects associated with the structured data container.

16. The one or more non-transitory computer-readable storage media of claim 15, the operations further comprising:
receiving an indication of a selection of the one or more selectable objects associated with the structured data container; and
causing presentation, based at least in part on the selection of the one or more selectable
objects and via the second graphical user interface, of an unfurled view of the structured data container.

17. The one or more non-transitory computer-readable storage media of claim 15, wherein the structured data container is associated with a set of permissions configured to limit a visibility of the at least one field of the plurality of fields associated with the group-based communication platform.

18. The one or more non-transitory computer-readable storage media of claim 15, wherein the virtual space includes at least one of a channel, a canvas, a multimedia collaboration session, or a direct message.

* * * * *